United States Patent
Kapoor et al.

(10) Patent No.: US 10,698,564 B2
(45) Date of Patent: Jun. 30, 2020

(54) USER TERMINAL DEVICE AND DISPLAYING METHOD THEREOF

(71) Applicant: SAMSUNG ELECTRONICS CO., LTD., Suwon-si (KR)

(72) Inventors: Parichay Kapoor, Suwon-si (KR); Mehul Kumar, Suwon-si (KR); Sun-hwa Kim, Seoul (KR); Jin-sung Kim, Seoul (KR); Hwakyung Kim, Seoul (KR); Pankaj Agarwal, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 325 days.

(21) Appl. No.: 15/290,431

(22) Filed: Oct. 11, 2016

(65) Prior Publication Data

US 2017/0153792 A1    Jun. 1, 2017

(30) Foreign Application Priority Data

Nov. 30, 2015   (KR) .................. 10-2015-0168789

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0482* (2013.01); *G06F 3/0486* (2013.01); *G06F 3/04855* (2013.01); *G06F 3/04883* (2013.01); *G06F 3/04886* (2013.01); *G06F 3/167* (2013.01); *G06F 2203/0381* (2013.01)

(58) Field of Classification Search
CPC ............ G06F 3/04817; G06F 3/04883; G06F 3/04845; G06F 3/04886; G06F 3/0486; G06F 3/0482; G06F 3/04855; G06F 2203/0381; G06F 3/167
See application file for complete search history.

(56) References Cited

U.S. PATENT DOCUMENTS

| | | | |
|---|---|---|---|
| 9,240,165 B2 | 1/2016 | Bae et al. | |
| 2004/0223623 A1* | 11/2004 | Lo | H04R 3/005 381/92 |

(Continued)

FOREIGN PATENT DOCUMENTS

| | | |
|---|---|---|
| JP | 2013-235586 A | 11/2013 |
| KR | 10-2008-0041809 A | 5/2008 |

(Continued)

OTHER PUBLICATIONS

Smith (Introducing Emoji++, published Oct. 2, 2014, pp. 2).*

(Continued)

*Primary Examiner* — Stephen S Hong
*Assistant Examiner* — Ahamed I Nazar
(74) *Attorney, Agent, or Firm* — Sughrue Mion, PLLC

(57) ABSTRACT

A user terminal device includes a touch screen including a main display area and an auxiliary display area including a curved portion extending from the main display area, and a processor configured to, in response to an input for moving an icon displayed on the main display area to the auxiliary display area, control the touch screen to display the icon on the auxiliary display area.

10 Claims, 58 Drawing Sheets

(51) Int. Cl.
*G06F 3/0488* (2013.01)
*G06F 3/0482* (2013.01)
*G06F 3/0486* (2013.01)
*G06F 3/0485* (2013.01)
*G06F 3/16* (2006.01)

(56) References Cited

U.S. PATENT DOCUMENTS

| | | | |
|---|---|---|---|
| 2007/0198946 A1* | 8/2007 | Viji | G06F 9/451 |
| | | | 715/779 |
| 2011/0054890 A1* | 3/2011 | Ketola | G10L 21/06 |
| | | | 704/231 |
| 2011/0148772 A1 | 6/2011 | Oksman et al. | |
| 2012/0295708 A1* | 11/2012 | Hernandez-Abrego | |
| | | | G10L 15/26 |
| | | | 463/36 |
| 2013/0145316 A1 | 6/2013 | Heo | |
| 2013/0178248 A1 | 7/2013 | Kim | |
| 2013/0293510 A1 | 11/2013 | Clifton et al. | |
| 2015/0015511 A1* | 1/2015 | Kwak | G06F 3/013 |
| | | | 345/173 |
| 2015/0031417 A1* | 1/2015 | Lee | H04M 1/72519 |
| | | | 455/566 |
| 2015/0143238 A1* | 5/2015 | Jung | G06F 3/04817 |
| | | | 715/708 |
| 2015/0194152 A1* | 7/2015 | Katuri | G10L 15/22 |
| | | | 704/231 |
| 2015/0242006 A1* | 8/2015 | Kim | G06F 1/1626 |
| | | | 345/173 |
| 2016/0066440 A1 | 3/2016 | Choi et al. | |
| 2016/0284350 A1* | 9/2016 | Yun | G10L 15/22 |

FOREIGN PATENT DOCUMENTS

| | | |
|---|---|---|
| KR | 10-2013-0081617 A | 7/2013 |
| KR | 10-1368651 B1 | 3/2014 |
| KR | 10-2014-0039542 A | 4/2014 |
| KR | 10-2015-0007911 A | 1/2015 |
| KR | 10-2015-0039293 A | 4/2015 |
| KR | 10-1516766 B1 | 5/2015 |
| KR | 10-1559091 B1 | 10/2015 |
| KR | 10-2016-0001561 A | 1/2016 |
| KR | 10-1584590 B1 | 1/2016 |
| KR | 10-1588294 B1 | 1/2016 |
| KR | 10-2016-0027856 A | 3/2016 |
| WO | 2015/005734 A1 | 1/2015 |
| WO | 2015137580 A1 | 9/2015 |

OTHER PUBLICATIONS

International Search Report dated Feb. 14, 2017 issued by International Searching Authority in counterpart International Application No. PCT/KR2016/012846 (PCT/ISA/210).

Written Opinion dated Feb. 14, 2017 issued by International Searching Authority in counterpart International Application No. PCT/KR2016/012846 (PCT/ISA/237).

* cited by examiner

FIG. 38

| | ㄱ | ㄴ | ㄷ | ㄹ | ㅁ | ㅂ | ㅅ | | ㅈ | ㅊ |
|---|---|---|---|---|---|---|---|---|---|---|
| CONSONANT | ○●<br>○○<br>○○ | ●●<br>○○<br>○○ | ○●<br>●○<br>○○ | ○○<br>○●<br>○○ | ●○<br>○●<br>○○ | ○●<br>○●<br>○○ | ○○<br>○○<br>○● | | ○●<br>○○<br>○● | ○○<br>○●<br>○● |
| | ㄱ | ㄴ | ㄷ | ㄹ | ㅁ | ㅂ | ㅅ | ㅇ | ㅈ | ㅊ |
| SUPPORT CONSONANT | ●○<br>○○<br>○○ | ○○<br>●●<br>○○ | ○○<br>○●<br>●○ | ○○<br>○○<br>●○ | ○○<br>○○<br>○● | ●○<br>●○<br>○○ | ○○<br>○○<br>●○ | ○○<br>●●<br>●○ | ●○<br>○○<br>●○ | ○○<br>●○<br>●○ |
| VOWEL | ㅏ<br>●○<br>○●<br>○● | ㅑ<br>○●<br>○○<br>●○ | ㅓ<br>○●<br>●○<br>●○ | ㅕ<br>●○<br>○○<br>●○ | ㅗ<br>●○<br>○○<br>●● | ㅛ<br>○●<br>○○<br>●● | ㅜ<br>●●<br>○○<br>○● | ㅠ<br>●●<br>○○<br>●○ | ─<br>○●<br>●○<br>○● | ㅣ<br>●○<br>●○<br>○● |
| | ㅐ<br>●○<br>●●<br>●○ | ㅒ<br>○●<br>○●<br>●○ | ㅔ<br>●○<br>●○<br>●○ | ㅖ<br>●●<br>○●<br>●○ | ㅘ<br>○●<br>○○<br>●○ | ㅙ | ㅚ | ㅝ | ㅟ | ㅞ |
| ABBREVIATION | 가<br>●●<br>●○<br>○● | 나<br>●●<br>○○<br>○○ | 다<br>○●<br>●○<br>○○ | 마<br>●●<br>○●<br>○○ | 바<br>○●<br>○●<br>○○ | 사<br>●○<br>○●<br>○○ | 자<br>○●<br>○○<br>●○ | 카<br>●●<br>●○<br>○● | 타<br>●○<br>●●<br>○○ | 파<br>●●<br>○●<br>○○ |
| | 열 | 영 | 옥 | 온 | 옹 | 운 | 울 | 은 | 을 | 인 |

FIG. 39

USER TERMINAL DEVICE AND DISPLAYING METHOD THEREOF

CROSS-REFERENCE TO RELATED APPLICATION(S)

This application claims priority from Korean Patent Application No. 10-2015-0168789, filed in the Korean Intellectual Property Office on Nov. 30, 2015, the disclosure of which is incorporated herein by reference in its entirety.

BACKGROUND

1. Field

Apparatuses and methods consistent with exemplary embodiments relate to a user terminal device and a displaying method thereof, and more particularly, to a user terminal device for providing various interactions using a touch screen that is divided into a main display area and at least one auxiliary display area, and a displaying method thereof.

2. Description of the Related Art

Due to the advancement of electronic technologies, various types of user terminal devices have been developed and distributed. User terminal devices have become smaller and are capable of providing various functions. Thus, there are growing uses for such user terminal devices.

A user terminal device may provide various contents such as multimedia contents, application screens, videos, pictures, social media, etc., upon a user's request. A user may select a desired function by using a button, a touch screen, voice command, etc., provided on the user terminal device. The user terminal device may selectively execute a program according to an interaction with the user and display the execution result.

As more functions are provided by a user terminal device, various methods of displaying contents and methods of user interaction are developed. In other words, as the types of contents and the number of functions increase, interaction methods become more complex.

Accordingly, it is useful to develop user interaction technologies that enable more convenient use of a user terminal device. For example, if a user is physically challenged, e.g., has visual or hearing impairment, there may be a need for a method that allows the user to more conveniently perform an interaction with a user terminal device.

SUMMARY

Exemplary embodiments provide a user terminal device for providing various interactions using a touch screen that is divided into a main display area and at least one auxiliary display area, and a displaying method thereof.

According to an exemplary embodiment, there is provided a user terminal device including a touch screen including a main display area and an auxiliary display area including a curved portion extending from the main display area; and a processor configured to, in response to an input for moving an icon that is displayed on the main display area to the auxiliary display area, control the touch screen to display the icon on the auxiliary display area.

The processor may be further configured to, in response to an application being executed, control the touch screen to display an icon that is registered with respect to the application on the auxiliary display area.

The processor may be further configured to, in response to a number of icons registered with respect to an application in operation being more than a predetermined number, control the touch screen to display the icons arranged according to a predetermined standard on the auxiliary display area.

The icon may be at least one of an emoticon that is input in a text input area of the auxiliary display area, a special character, a predetermined character set, and a function key to perform a function.

The processor may be further configured to control the touch screen to display at least one of a virtual keyboard and a handwriting input area on the main display area, and to display the moved icon on the auxiliary display area.

The processor may be further configured to register the moved icon as a function icon corresponding to a predetermined event.

The processor may be further configured to, in response to sensing an input on the auxiliary display area, change a function icon displayed on the auxiliary display area to another function icon and display the changed function icon.

The processor may be further configured to control the touch screen to display at least one of a virtual keyboard and a handwriting input area on a predetermined area of the main display area, and to display the function icon on the auxiliary display area that is nearest to the at least one of the virtual keyboard and the handwriting input area.

According to an aspect of another exemplary embodiment, there is provided a user terminal device, including: a touch screen including a main display area and an auxiliary display area including a curved portion extending from the main display area; and a processor configured to, in response to an event occurring, determine a display area, from among the main display area and the auxiliary display area, for displaying information corresponding to the event, and control the touch screen to display the information corresponding to the event on the determined display area.

The processor may be further configured to determine the display area, from among the main display area and the auxiliary display area, based on at least one of a location of the user terminal device, time, a disposition direction, an application corresponding to the event, and a text length of the information.

The touch screen may include a plurality of auxiliary display areas, and the processor may be further configured to, in response to determining that the information corresponding to the event is to be displayed in an auxiliary display area, determine the auxiliary display area, from among the plurality of auxiliary display areas, in which the information corresponding to the event is to be displayed.

The device may include a microphone configured to receive sound, and the processor may be further configured to determine a direction of the received sound, and control the touch screen to display direction information on an auxiliary display area corresponding to the determined direction.

The processor may be further configured to analyze the received sound, and control the touch screen to display information corresponding to the analyzed sound on at least one of the main display area, a first auxiliary display area and a second auxiliary display area.

The device may include a communicator configured to receive a plurality of data and order information about an order of the plurality of data from another terminal device.

The other terminal device may be at least one of a station terminal and a signal light terminal, and wherein the plurality of data may include at least one of information regarding a signal light state, information regarding a stopped bus, and time information regarding a bus to be stopped.

According to an aspect of another exemplary embodiment, there is provided a displaying method of a user terminal device including a touch screen, the touch screen including a main display area and an auxiliary display area including a curved portion extending from the main display area, the method including: sensing an input for moving an icon that is displayed on the main display area to the auxiliary display area; and displaying the icon on the auxiliary display area.

The displaying may include, in response to an application being executed, displaying an icon that is registered with respect to the application on the auxiliary display area.

According to an aspect of another exemplary embodiment, there is provided a displaying method of a user terminal device including a touch screen, the touch screen including a main display area and an auxiliary display area including a curved portion extending from the main display area, the method including: sensing an event; determining a display area, from among the main display area and the auxiliary display area, for displaying information corresponding to the event; and displaying the information corresponding to the event on the determined display area.

The determining may include determining the display area, from among the main display area and the auxiliary display area, based on at least one of a location of the user terminal device, time, a disposition direction, an application corresponding to the event, and a text length of the information.

The touch screen may include a plurality of auxiliary display areas, and wherein the displaying may include, in response to determining that the information corresponding to the event is to be displayed in an auxiliary display area, determining the auxiliary display area, from among the plurality of display areas, in which the information corresponding to the event is to be displayed.

BRIEF DESCRIPTION OF THE DRAWINGS

The above and/or other aspects will be more apparent by describing one or more exemplary embodiments with reference to the accompanying drawings, in which:

FIGS. 17 to 50 are views illustrating an interaction screen of a user terminal device, according to one or more exemplary embodiments.

DETAILED DESCRIPTION

Below, exemplary embodiments will be described in greater detail with reference to the accompanying drawings.

It should be understood that the technology described may not be limited to an exemplary embodiment, and various modifications, equivalents, and/or alternatives of exemplary embodiments may be included. Like numerals refer to like elements throughout. As used herein, the term "and/or" includes any and all combinations of one or more of the associated listed items. Expressions such as "at least one of" when preceding a list of elements, modify the entire list of elements and do not modify the individual elements of the list.

It will be understood that the terms "comprises," "may comprise," "includes," and/or "may include," when used herein, indicate the presence of features (for example, numerical values, functions, operations, elements, and/or components), but do not preclude the presence or addition of one or more other features.

It will be understood that, although the terms first, second, etc., may be used to refer to elements without indicating an order and/or importance, such elements should not be construed as limited by these terms. The terms are used to distinguish one element from other elements. For example, a first element may refer to a second element, and a second element may refer to a first element.

The terminology used herein is for describing exemplary embodiments and is not intended to be limiting. As used herein, the singular forms "a", "an" and "the" are intended to include the plural forms as well, unless the context clearly indicates otherwise. In other words, elements referred to in the singular may include one or more elements, unless the context clearly indicates otherwise.

Unless otherwise defined, all terms used herein have a meaning as understood by one of ordinary skill in the art. It will be further understood that terms should be interpreted as having a meaning that is consistent with their meaning in the context of the relevant art and will not be interpreted in an idealized or overly formal sense, unless expressly so defined.

According to one or more exemplary embodiments, 'a module' or 'a unit' performs at least one function or operation, and may be realized as hardware, software, and/or any combination thereof. In addition, a plurality of 'modules' or a plurality of 'units' may be integrated into at least one module and may be realized as at least one processor.

Figure 1:
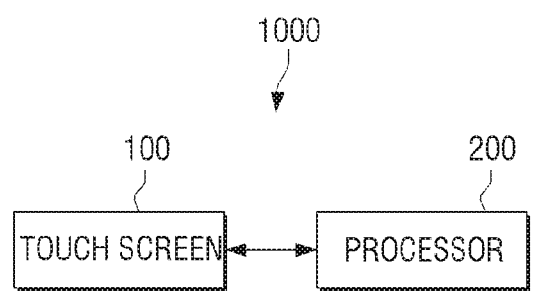
FIG. 1 is a block diagram illustrating a configuration of a user terminal device, according to an exemplary embodiment.

FIG. 1 is a block diagram illustrating a configuration of a user terminal device, according to an exemplary embodiment. A user terminal device 1000 of FIG. 1 may be used to input data through a communication network or output a processing result, and may be implemented with various types of devices such as a television (TV), personal computer (PC), laptop PC, mobile phone, tablet PC, personal digital assistant (PDA), MP3 player, kiosk, electronic ink device (e-ink), e-album, etc. The user terminal device may be referred to as a mobile device if it is realized as a portable device such as a mobile phone, tablet PC, PDA, MP3 player, laptop PC, etc.

Referring to FIG. 1, the user terminal device 1000 includes a touch screen 100 and a processor 200.

The touch screen 100 may perform a display function together with a function of receiving a user manipulation, and may be divided into a main display area and at least one auxiliary display area. The size of the auxiliary display area may be smaller than the main display area. In addition, the at least one auxiliary display area may formed on a different surface than the main display area. For example, the main display area may be disposed on a front surface of the user terminal device 1000, and the at least one auxiliary display area may be disposed on a different surface, such as a right side surface, a left side surface, and a back surface, etc.

The front surface may refer to a main area in which a user interaction takes place, and an area which is disposed toward (to face) a user when the user is using the user terminal device. The side surface may be a left side surface and/or a right side surface with reference to the front side, and may also be an upper surface and/or a lower surface. Accordingly, the main display area may be disposed in a user direction (e.g., toward/facing a user), and the auxiliary display area may be a left side area and/or a right side area with reference to the front side.

The surface including the main display area (e.g., a planar or a curved surface) and the surface including the at least one auxiliary display area (e.g., a planar or a curved surface) may be fixed to form an obtuse angle. The shape, location, and number of the auxiliary display area may vary according to one or more exemplary embodiments, which will be described below in detail with reference to accompanying figures. The auxiliary display area may be referred to as an edge or an edge area. The touch screen may be referred to as a bended touch screen (e.g., bent touch screen), and if the bent form is changeable, the touch screen may be referred to as a flexible touch screen.

The processor 200 may control the main display area and the at least one auxiliary display of the touch screen 100 separately. For example, the main display area and the at least one auxiliary display area may display different contents. In addition, the processor 200 may control the touch screen 100 so that the main display area and the at least one auxiliary display area display a same content. The type, displaying method, layout, etc., of the content displayed on the main display area and at least one auxiliary display area may vary according to one or more exemplary embodiments, which will be described below in detail. Here, 'display' may refer to displaying an image generated by the processor 200 using various image display elements such as liquid crystal display (LCD), light emitting diode (LED), organic light emitting diode (OLED) electrophoretic ink (E-ink), etc.

Figure 2:
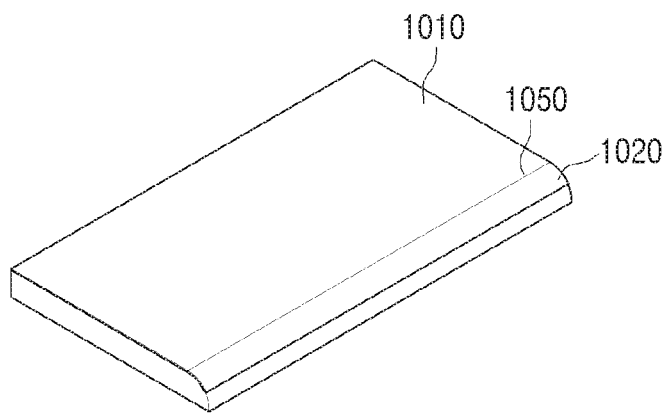
FIGS. 2 to 10 are views illustrating a touch screen, according to one or more exemplary embodiments.

FIG. 2 is a view illustrating an external configuration of a user terminal device including a touch screen that is divided into one auxiliary display area and a main display area, according to an exemplary embodiment.

Referring to FIG. 2, the touch screen 100 may be divided into a main display area 1010 disposed on a front surface of the user terminal device 1000, and an auxiliary display area 1020, which is disposed on a right side surface of the user terminal device 1000. In FIG. 2, the main display area 1010 and the auxiliary display area 1020 are divided by a border area 1050. Considering that the touch screen 100 is in a bent state, the border area 1050 may be referred to as a bending line.

Figure 3:
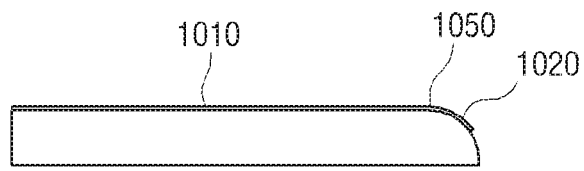

FIG. 3 is a view illustrating a cross sectional configuration of the user terminal device of FIG. 2, according to an exemplary embodiment. Referring to FIG. 3, the main display area 1010 and the auxiliary display area 1020 of the touch screen 100 may be disposed on the front surface and the side surface of the user terminal device 1000, respectively. According to an exemplary embodiment, the auxiliary display area 1020 is disposed on part of the side surface, but it may also be configured to cover the entire area the side surface.

Figure 4:
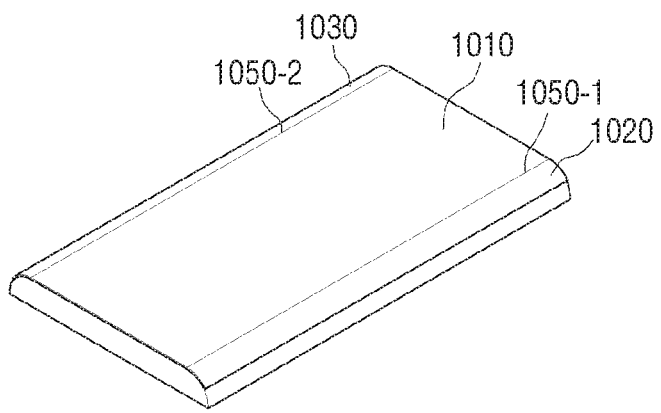
Figure 5:
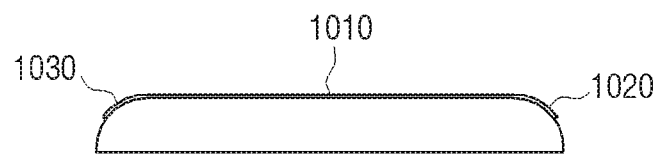

FIGS. 4 and 5 are views illustrating an example of an external configuration of a user terminal device including a touch screen that is divided into two auxiliary display areas and a main display area, and an example of cross sectional configuration thereof, respectively.

Referring to FIG. 4, the main display area 1010 is disposed on a front surface and the auxiliary display areas 1020, 1030 are disposed on a right side surface and a left side surface, respectively. The main display area 1010 and each auxiliary display area 1020, 1030 are divided by border areas 1050-1, 1050-2.

Referring to FIG. 5, each auxiliary display area 1020, 1030 may be disposed to form an obtuse angle with respect to the main display area 1010 so that the auxiliary display areas can be viewed from the direction of the front surface. According to an exemplary embodiment, the auxiliary display areas 1020, 1030 are disposed only on part of the side surface, but each of the auxiliary display areas 1020, 1030 may also be disposed to cover the entire area of the side surface, which will be described below with reference to FIGS. 6 and 7.

Figure 6:
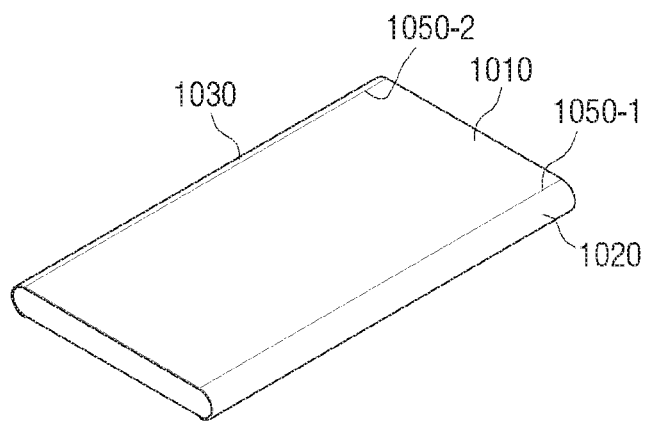
Figure 7:
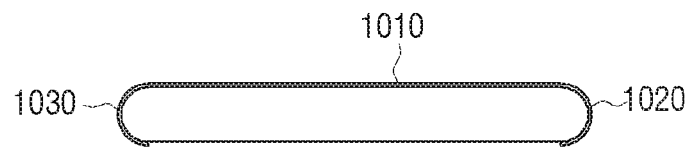

FIGS. 6 and 7 are views illustrating a user terminal device including a touch screen that is divided into two auxiliary display areas and a main display area, according to an exemplary embodiment.

Referring to FIGS. 6 and 7, the two auxiliary display areas 1020, 1030 are disposed on both sides with reference to the main display area 1010, and may be fixed at an angle at which the auxiliary display areas are viewable from the directions of the right side or the left side rather than the direction of the front surface. Each of the auxiliary display areas 1020, 1030 may be bent at almost 90° with respect to the main display area 1010.

According to another exemplary embodiment, an auxiliary display area may be disposed on a side in an opposite direction of the main display area 1010, which will be described below with reference to FIGS. 8 and 9.

Figure 8:
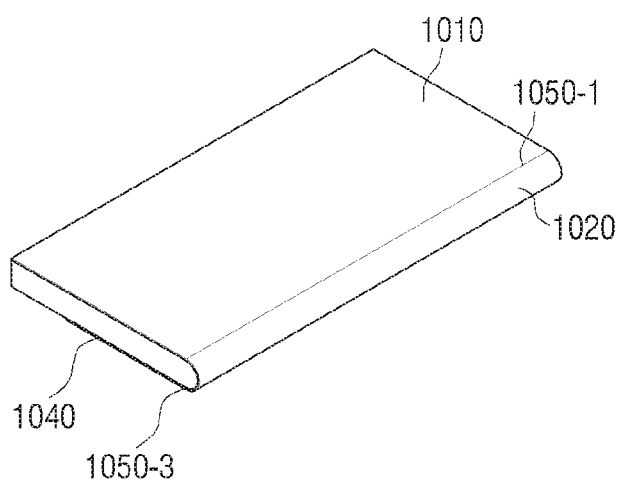
Figure 9:
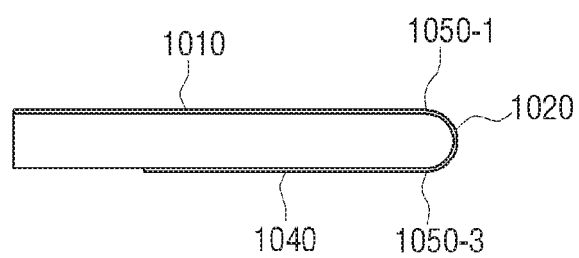

FIGS. 8 and 9 are views illustrating a user terminal device including a touch screen that is divided into two auxiliary display areas and a main display area, according to an exemplary embodiment.

Referring to FIGS. 8 and 9, the touch screen 100 is divided into the main display area formed on a front surface, the first auxiliary display area 1020 formed on a side surface, and the third auxiliary display area 1040 formed on a back surface. The third auxiliary display area 1040 may not cover the entire area of the back surface and may be formed only on part of the back surface. The processor 200 may divide the touch screen into the main display area 1010, the first auxiliary display area 1020 and the third auxiliary display area with reference to a first border area 1050-1 and a third border area 1050-3, respectively, and display different contents on each area.

In FIGS. 3 to 9, the auxiliary display areas 1020, 1030 are bent in a round form, but the auxiliary display areas 1020, 1030, 1040 may be formed in a planar surface form. In this case, the planar surface including the main display area 1010 and the planar surface including the auxiliary display areas 1020, 1030, 1040 may come into contact along a border line. In other words, the border areas 1050-1, 1050-2, 1050-3 may be provided in the form of line.

The user terminal device 1000 may have a cross section in the form of triangle. The surface including the main display area 1010 and the surface including the auxiliary display area 1020 are connected to each other to form an obtuse angle ($\theta$) at the border area 1050. In addition, the cross sectional configuration may be provided in various forms such as a trapezoid, a pentagon, etc.

Above, the touch screen 100 has a bent shape in a horizontal direction with reference to the front surface of a user terminal device, but this is only an example. The touch screen 100 may be bent in a vertical direction with reference to the front surface of the user terminal device 1000.

Figure 10:
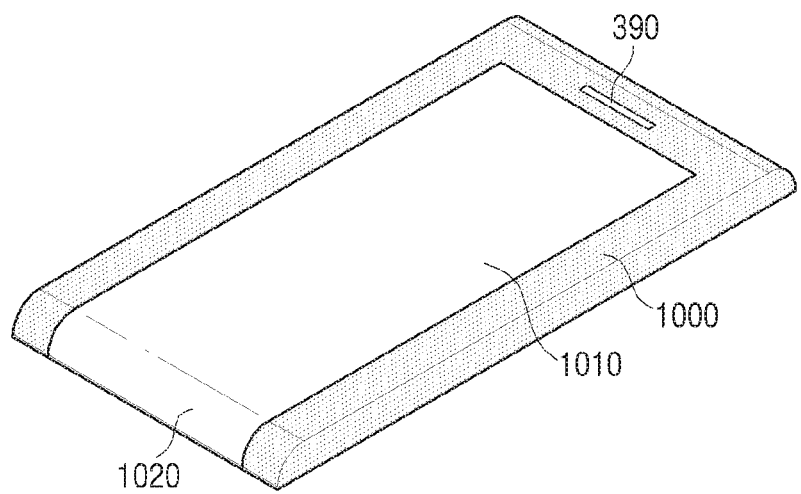

FIG. 10 illustrates a touch screen 100 that is bent in a vertical direction. The touch screen 100 may be divided into the main display area 1010 which is disposed on the front surface of the user terminal device 1000 and the auxiliary display area 1020 which is disposed on a lower surface. A speaker 390 may be disposed on an upper side of the main display area 1010.

FIG. 1 illustrates a configuration of a user terminal device including the touch screen 100 and the processor 200, but according to one or more exemplary embodiments, the user terminal device 1000 may further include various elements. For example, the user terminal device 1000 may further include a memory which stores various applications. The processor 200 may execute an application which is stored in the memory according to a user gesture and display contents provided by the application on a main display area and an auxiliary display area.

Below, for the convenience of explanation, the content displayed on a main display area will be referred to as a main content, and the content displayed on an auxiliary display area will be referred to as an auxiliary content. In addition, for convenience of explanation, a main content provided by a first application will be referred to as a first main content, and an auxiliary content provided by the first application will be referred to as a first auxiliary content, and main content provided by a second application will be referred to as a second main content, and an auxiliary content provided by the second application will be referred to as a second auxiliary content. The application refers to a program which can be installed in a platform to provide a service.

The processor 200 may display a main content and an auxiliary content in a different layout. If an application is changed, the processor 200 may display a main content and an auxiliary content according to the changed application on a main display area and an auxiliary display area, respectively.

In addition, the user terminal device 1000 may be configured in various forms.

Figure 11:
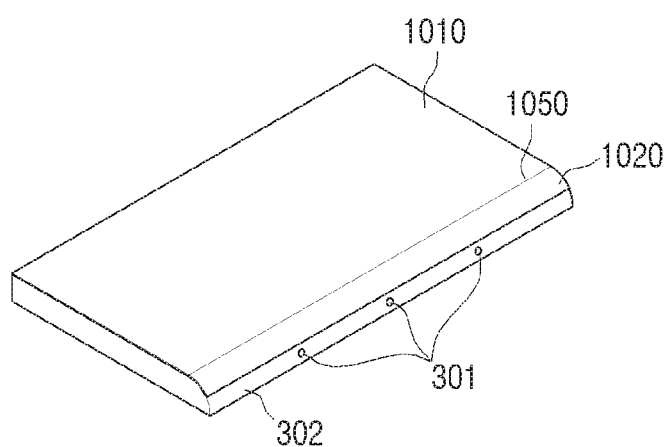
FIGS. 11 to 13 are views illustrating a user terminal device according to one or more exemplary embodiments.

FIG. 11 is a view illustrating an example of an external configuration of a user terminal device including a touch screen that is divided into one auxiliary display area and a main display area, according to an exemplary embodiment.

Referring to FIG. 11, the main display area 1010 is disposed on a front surface, and the auxiliary display area 1020 is disposed on a right side surface. The main display area 1010 and the auxiliary display area 1020 are divided by the border area 1050.

A case 302 which constitutes an external form of the user terminal device 1000 is disposed on the back surface and the side surface of the user terminal device 1000. The case 302 may be made of various materials such as metal, plastic, etc., and the side area of the case 302 (e.g., the side area of the user terminal device 1000) may have a plurality of protrusions 301.

The plurality of protrusions 301 are provided to allow a user to recognize a specific position of the auxiliary display area 1020 easily and may be disposed on positions corresponding to auxiliary touch areas which will be described below. According to an exemplary embodiment, 301 may be another element such as a groove, another surface made of materials having a different texture, or a haptic using an oscillation function may be used as long as they allow a user to feel a position. According to an exemplary embodiment, the case 302 includes three protrusions, but one, two, four or more protrusions may be included.

Figure 12:
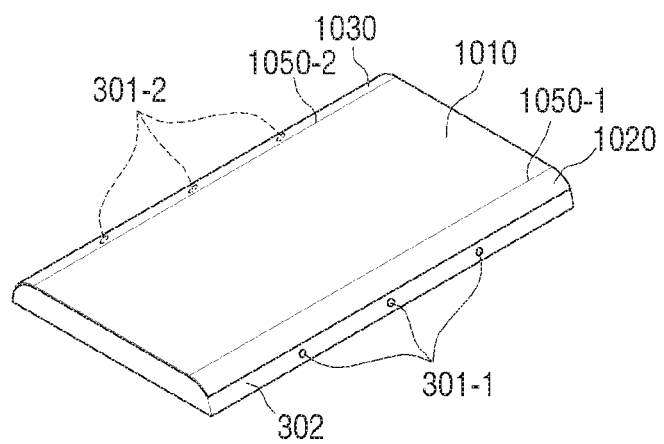
Figure 13:
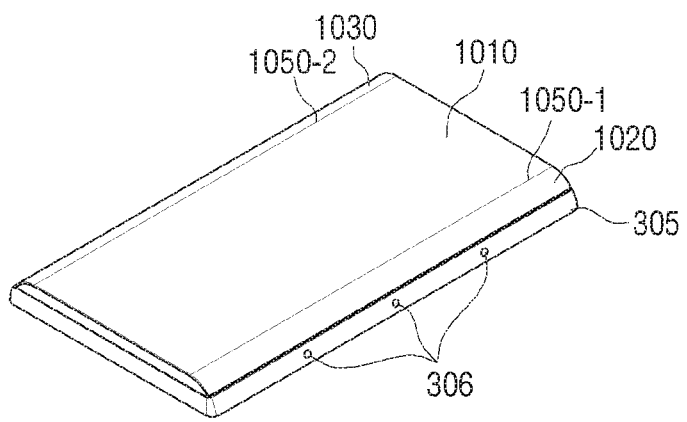

FIGS. 12 and 13 are views illustrating an example of external configuration of a user terminal device including a touch screen that is divided into two auxiliary display areas and a main display area, according to an exemplary embodiment.

Referring to FIG. 12, the main display area 1010 is disposed on a front surface, and the auxiliary display areas 1020, 1030 are disposed on a left side surface and a right side surface, respectively. The main display area 1010 and the auxiliary display areas 1020, 1030 are divided by the border areas 1050-1, 1050-2.

The case 302 which constitutes an external form of the user terminal device 1000 is disposed on the back surface and the side surface of the user terminal device 1000. A plurality of protrusions 301-1, 302-2 are disposed on a left side surface and a right side surface, respectively.

In the above description, protrusions are disposed on the case constituting the user terminal device 1000, but the protrusions may be disposed on a case which can be detached from the user terminal device 1000, which will be described below with reference to FIG. 13.

Referring to FIG. 13, a case 305 can be attached to or detached from the user terminal device 1000, and when the case 305 is mounted, the case 305 is disposed to cover the back surface and the side surface of the user terminal device 1000. A plurality of protrusions 306 are disposed on each of the left side surface and the right side surface of the case. The case 305 may be a cover (e.g., a battery cover) to open the inside of the user terminal device 1000, or may be a bumper case that is further mounted by a user to protect the external shape of the user terminal device 1000.

Figure 14:
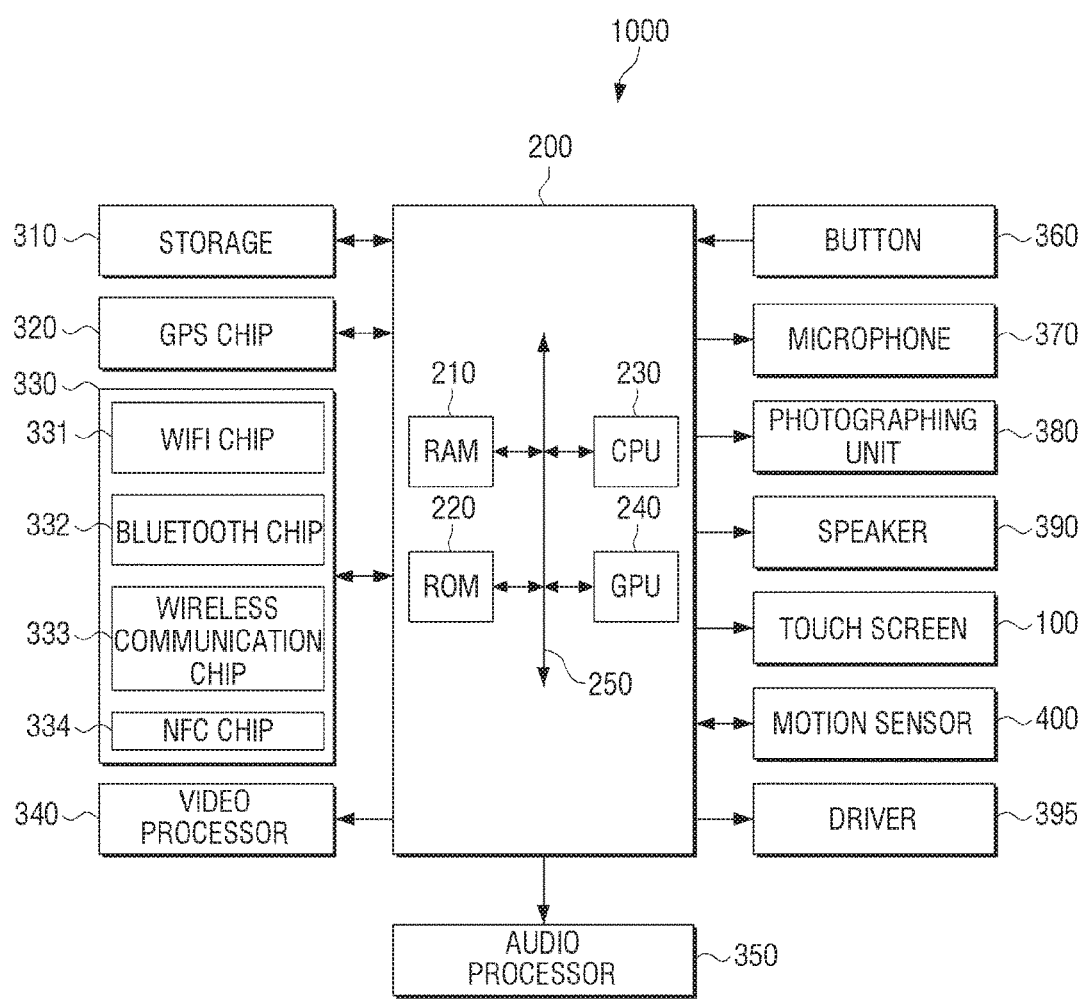
FIG. 14 is a block diagram illustrating a configuration of a user terminal device, according to one or more exemplary embodiments.

FIG. 14 is a block diagram illustrating an example of detailed configuration of the user terminal device 1000 as a mobile phone, according to an exemplary embodiment.

Referring to FIG. 14, the user terminal device 1000 includes the touch screen 100, the processor 200, a storage 310, a GPS chip 320, a communicator 330, a video processor 340, an audio processor 350, a button 360, a microphone 370, a photographing unit 380, a speaker 390, a driver 395, and a motion sensor 400.

The touch screen 100 may be divided into a main display area and at least one auxiliary display area. The touch screen 100 may be realized as various forms of displays such as Liquid Crystal Display (LCD), Organic Light Emitting Diodes (OLED) display, Plasma Display Panel (PDP), etc. The touch screen 100 may further include a driving circuit, a backlight unit, etc., which can be embodied in the form of a-si TFT, LTPS (low temperature poly silicon) TFT, OTFT (organic TFT), etc. In addition, the touch screen 100 may be embodied as a bent display or a flexible display. Alternatively, the touch screen 100 may be embodied as a display which is not flexible. If the touch screen 100 is embodied as a display, the touch screen 100 may be configured by connecting a plurality of displays.

The touch screen 100 may include a touch sensor to sense a user's touch gesture. Through such a touch sensor, the touch screen may receive various user commands (e.g., user gestures). The touch sensor may be embodied as various types of sensors such as such as capacitive sensors, resistive sensors, piezoelectric sensors, and so on. The capacitive type uses a dielectric material coated on the surface of the touch screen, and senses the micro electricity excited by part of the user body as it touches on the surface of the touch screen and calculates a touch coordinate. The resistive type includes two electrode plates embedded within the touch screen, and senses an electric current flow as the user touches on the screen and the upper and the lower plates at the touched point are brought into contact each other, and calculates a touch coordinate. If the user terminal device 1000 supports a pen input function, the touch screen 100 may sense a user gesture using an input means such as a pen or stylus, etc. The sensed user gesture may be referred to as an input of a user command. In other words, an input of a user command may be interpreted to have the same meaning as sensing a user gesture. The user gesture refers to touch, drag, drag and drop, flick, swipe, double-tap, pinch-open, pinch-close, touch and hold, etc., on the touch screen 100 using a user's body part such as a user's finger, etc. The input of moving an icon displayed on a main display area to an auxiliary display area, i.e., a drag-and-drop, may be referred to as a function icon registration gesture.

If the input means is a stylus pen including a coil therein, the user terminal device 1000 may include a magnetic field detection sensor which senses a magnetic fiend changed by a coil inside the stylus pen. Accordingly, a touch gesture and a proximity gesture, i.e., hovering, may be sensed.

In the above description, one touch screen 100 performs both an image display function and a touch gesture detection function, but this is only an example. The display function and the gesture detection function may be performed by different elements. For example, the touch screen 100 may be embodied as a combination of a display apparatus capable of displaying an image only and a touch panel capable of sensing a touch only.

The storage 310 (e.g., memory) may store various programs and data which may be used to perform the operations of the user terminal device 1000. The storage 310 may store programs and data to configure various user interfaces (UIs) to be displayed on a main display area and an auxiliary display area.

The storage 310 stores a plurality of applications. In addition, the storage 310 stores function icon information corresponding to each application. The icon may refer to a character or a drawing representing a command provided by a user terminal device. The function icon information may be information regarding an icon which can be displayed on an auxiliary display area on the side of a virtual keyboard when the virtual keyboard is displayed on a main display area, and may be information regarding an icon inputtable on a character input area, a special character, a predetermined set of characters, a function key to perform a specific function (e.g., mail transmission, a character transmission, etc.), etc. The predetermined set of characters may refer to a set of characters which are frequently used by a user. For example, '.com', '.kr', etc.

The storage 310 may store data received from another user terminal device. The another terminal device may be a bus stop terminal, a traffic signal, etc., and if the another terminal device is a bus stop terminal, the received data may be information regarding a stopped bus, time information regarding a bus which is scheduled to be stopped (for example, an expected arrival time), etc, and if the another terminal is a traffic signal, the received data may be information regarding the current signal state, etc.

The processor 200 displays a content on each of the main display area and the auxiliary display area of the touch screen 100 using programs and data stored in the storage 310. In addition, if there is a user's touch with respect to the main display area, the auxiliary display area and the border in-between, the processor 200 performs a control operation corresponding to the touch.

The processor 200 includes a RAM 210, a ROM 220, a CPU 230, a Graphic Processing Unit (GPU) 240, and a bus 250. The RAM 210, the ROM 220, the CPU 230, the GPU, etc., may be connected to one another through the bus 250.

The CPU 230 accesses the storage 310 to perform booting using an operating system (O/S) stored in the storage 310. In addition, the CPU 230 performs various operations using various programs, contents, data, etc., which are stored in the storage 310.

The ROM 220 stores a set of commands for booting a system. In response to a turn on command being inputted and power being supplied, the CPU 230 copies O/S stored in the storage 310 into the RAM 210 according to a command stored in the ROM 220, and boots the system by executing the O/S. In response to the booting being completed, the CPU 230 copies various programs stored in the storage 310 into the RAM 210, and perform various operations by executing the programs copied into the RAM 210.

When the booting of the user terminal device 1000 is completed, the GPU 240 displays a UI in an activated area between the main display area and the auxiliary display area. The GPU 240 may generate a screen including various objects such as an icon, an image, a text, etc., using a calculator and a renderer. The calculator calculates attribute values of objects to be displayed according to a layout of the screen, such as a coordinate value, a shape, a size, a color, etc. The renderer may generate a screen of various layouts including objects based on the attribute values calculated by the calculator. The screen generated by the renderer are provided to the touch screen 100 and displayed on each of the main display area and the auxiliary display area.

The GPS chip 320 is an element to receive a GPS signal from a Global Positioning System (GPS) satellite and calculate the current position of the user terminal device 1000. The processor 200 may calculate the user's position using the GPS chip 320.

The communicator 330 is an element to perform communication with various types of external devices according to various types of communication methods. The communicator 330 includes a Wi-Fi Chip 331, a Bluetooth chip 332, a wireless communication chip 333, and a Near Field Communication (NFC) chip 334. The processor 200 performs communication with various external devices using the communicator 330.

The Wi-Fi chip 331 and the Bluetooth chip 332 performs communication according to a Wi-Fi method and a Bluetooth method, respectively. When the Wi-Fi chip 331 or the Bluetooth chip 332 is used, a variety of connectivity information such as SSID and a session key may be transmitted and received first, and communication is established using the connectivity information, and then a variety of information may be transmitted and received. The wireless communication chip 333 refers to a chip which performs communication according to various communication standards such as IEEE, Zigbee, $3^{rd}$ Generation (3G), 3rd Generation Partnership Project (3GPP), Long Term Evolution (LTE), etc. The NFC chip 334 refers to a chip which operates in the NFC method using a band of 13.56 MHz from among various RF-ID frequency bands such as 135 kHz, 13.56 MHz, 433 MHz, 860-960 MHz, 2.45 GHz, etc.

The video processor 340 processes contents received through the communicator 330 or video data included in contents which are stored in the storage 310. The video processor 340 may perform various image processing with respect to video data, such as decoding, scaling, noise filtering, frame rate conversion, resolution conversion, etc.

The audio processor 350 processes contents received through the communicator 330 or audio data included in the contents which are stored in the storage 310. The audio processor 350 may perform various processing with respect to audio data, such as decoding, amplification, noise filtering, etc.

When a reproduction application regarding multimedia contents is executed, the processor 200 may operate the video processor 340 and the audio processor 350 to reproduce the corresponding contents. In this case, the touch screen 100 may display an image frame generated by the video processor 340 on at least one of the main display area and the auxiliary display area.

In addition, the speaker 390 outputs audio data generated by the audio processor 350. In addition, when a talkback (or a voice output function) is in operation, the speaker 390 may provide a text, function information, etc., which are displayed on the main display area 1010 to a user using voice. Further, the speaker 390 may provide information received from a peripheral device using voice.

The button 360 may be various types of buttons such as a mechanical button, a touch pad, a wheel, etc., which are formed on an area such as a front surface, a side surface, a back surface, etc., of the external surface of the main body of the user terminal device 1000.

The microphone 370 receives a user voice or other sounds and converts the same into audio data. The processor 200 may use a user voice which is input through the microphone 370 in a call process, or may convert the user voice into audio data and store the data in the storage 310. The microphone 370 may be configured as a stereo microphone which receives sounds from a plurality of locations. Accordingly, the microphone 370 may determine the location of a sound source using input sounds. According to an exemplary embodiment, the microphone 370 may generate a plurality of sound sources input from a plurality of directions, and as described above, the processor 200 may determine the directions.

The photographing unit 380 (e.g., camera, imaging device) photographs a still image or a moving image under the control of a user. The photographing unit 380 may be realized as a plurality of cameras such as a front camera and a backside camera. According to an exemplary embodiment, the photographing unit 380 may be used to obtain a user's image for tracking a user's gaze.

If the photographing unit 380 and the microphone 370 are provided, the processor 200 may perform a control operation according to a user voice which is input through the microphone 370 or a user motion which is recognized by the photographing unit 380. For example, the user terminal device 1000 may operate in a motion control mode or a voice control mode. If the user terminal device 1000 operates in a motion control mode, the processor 200 activates the photographing unit 380 to photograph a user and traces a motion change of the user to perform a corresponding control operation. If the user terminal device 1000 operates in a voice control mode, the processor 200 analyzes a user voice which is input through the microphone 370 and performs a control operation according to the analyzed user voice.

In the user terminal device 1000 which supports a motion control mode or a voice control mode, a voice recognition technology or a motion recognition technology may be used in the above-described one or more exemplary embodiments. For example, if a user takes a motion as if he or she selects an object displayed on a home screen or utters a voice command corresponding to the object, it is determined that the corresponding object is selected and a control operation matching the object may be performed.

The driver 395 generates haptic feedback. Specifically, if a specific event occurs using a motor, etc., which can generate oscillation, the driver 395 may generate haptic feedback to a user.

The motion sensor 400 senses a motion of the main body of the user terminal device 1000. In other words, the user terminal device 1000 may be rotated or tilted in various directions. The motion sensor 400 may sense motion characteristics such as rotation direction, angle, gradient, etc., using at least one of various sensors such as a magnetic sensor, a gyro sensor, and an acceleration sensor, etc.

In addition, the user terminal device 1000 may further include a USB port connectable to a USB connector, various external input ports for connecting to various external terminals such as a headset, a mouse, a LAN, etc., a DMB chip to receive and process a Digital Multimedia Broadcasting (DMB) signal, various sensors, etc., according to one or more exemplary embodiments.

Figure 15:
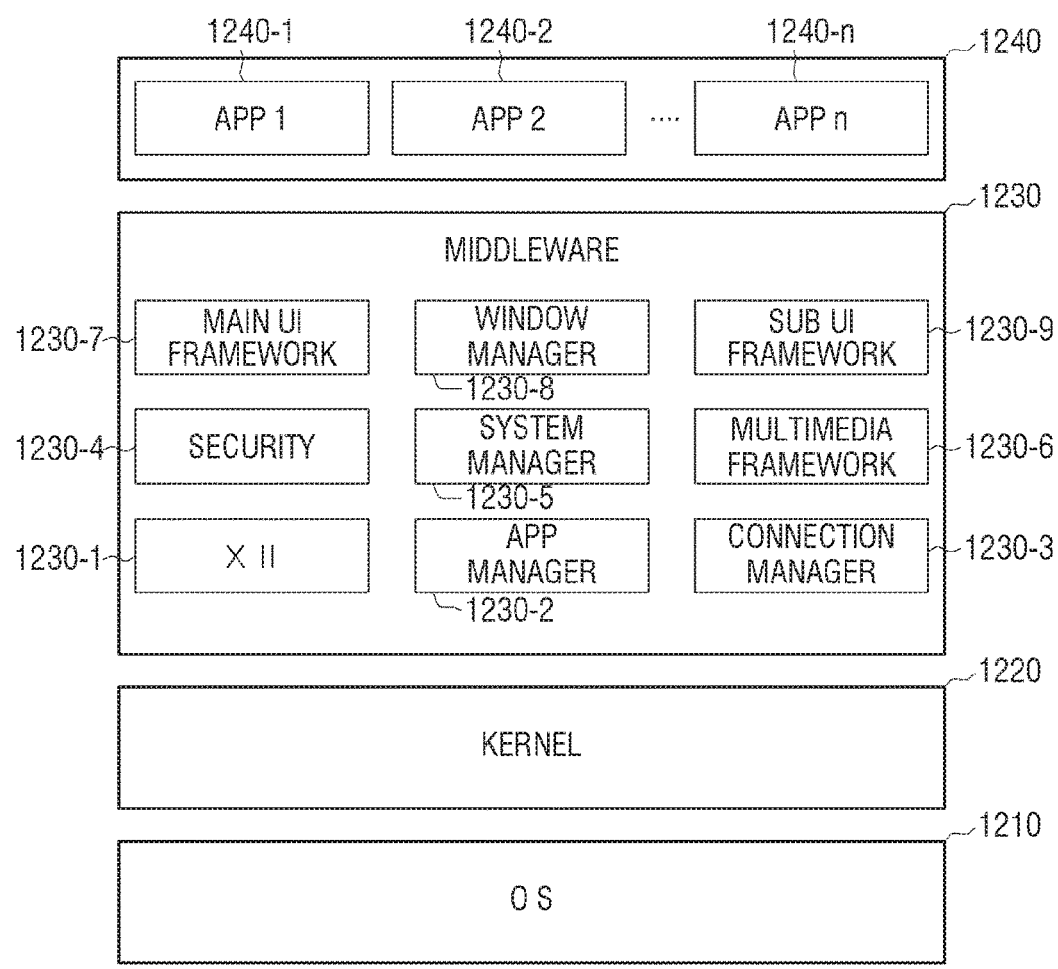
FIG. 15 is a view illustrating a software configuration of a user terminal device, according to an exemplary embodiment.

As described above, the storage 310 may store various programs. FIG. 15 is a view provided to explain the structure of software stored in the user terminal device 1000, according to an exemplary embodiment. Referring to FIG. 15, the storage 310 may store software including an O/S 1210, a kernel 1220, middleware 1230, an application 1240, etc.

The O/S(Operating System) 1210 controls and manages the overall operations of hardware. In other words, the O/S 1210 is responsible for management of hardware and basic functions such as memory, security, etc.

The kernel 1220 serves as a path through which various signals in addition to a touch signal, etc., sensed by the touch screen 100 are transferred to the middleware 1230.

The middleware 1230 includes various software modules for controlling the operations of the user terminal device 1000. The middleware 1230 may include an X11 module 1230-1, an APP manager 1230-2, a connection manager 1230-3, a security module 1230-4, a system manager 1230-5, a multimedia framework 1230-6, a main UI framework 1230-7, a window manager 1230-8, and a sub UI framework 1230-9.

The X11 module 1230-1 is a module for receiving various event signals from various hardware included in the user terminal device 1000. The event may include various events such as an event in which a user gesture is sensed, an event in which the user terminal device 1000 moves in a specific direction, an event in which a system alarm is generated, an event in which a specific program is executed or ended, etc.

The APP manager 1230-2 is a module for managing an execution state of various applications 1240 installed in the storage 310. When an application execution event is sensed from the X11 module 1230-1, the APP manager 1230-2 calls and executes an application corresponding to the event.

The connection manager 1230-3 is a module for supporting a wired or wireless network connection. The connection manager 1230-3 may include various detailed modules such as a DNET module and an UPnP module.

The security module 1230-4 is a module for supporting certification, permission, secure storage for hardware, etc.

The system manager 1230-5 monitors a state of each component within the user terminal device 1000 and provides the results to other modules. For example, when a residual battery is insufficient, an error occurs, or a communication connection is broken, etc., the system manager 1230-5 may provide the results to the main UI framework 1230-7 or the sub UI framework 1230-9 to output a notification message or a notification sound.

The multimedia framework 1230-6 is a module for playing multimedia contents which are stored in the user terminal device 1000 or provided from external sources. The multimedia framework 1230-6 may include a player module, a camcorder module, a sound processing module, and the like. Therefore, the multimedia framework 1230-6 may perform an operation of playing various multimedia contents to generate and play a screen and a sound The main UI framework 1230-7 is a module for providing various UIs to be displayed on a main display area of the touch screen 100, and the sub UI framework 1230-9 is a module for providing various UIs to be displayed in an auxiliary display area. The main UI framework 1230-7 and the sub UI framework 1230-9 may include an image compositor module configuring various objects, a coordinate compositor calculating coordinates at which objects are to be displayed, a rendering module rendering the configured objects at the calculated coordinates, a 2D/3D UI toolkit providing a tool for configuring a 2D or 3D type of UI, etc. The main UI framework 1230-7 may operate by interlocking with a main source IC which controls the operation of pixels in the main display area of the touch screen 100. The sub UI framework 1230-9 may operate by interlocking with a sub source IC which controls the operation of pixels in the auxiliary display area of the touch screen 100. The main source IC and the sub source IC will be described later with reference to FIG. 16B.

The window manager 1230-8 may sense a touch event from a user's body or a pen, or other input events. When the events are sensed, the window manager 1230-8 transfers the event signal to the main UI framework 1230-7 or the sub UI framework 1230-9 to perform an operation corresponding to the event When the user touches and drags the screen, various program modules such as a handwriting module for drawing a line depending on a drag trajectory, an angle calculation module for calculating a pitch angle, a roll angle, a yaw angle, etc., based on sensor values sensed by the motion sensor 400 may also be stored.

The application module 1240 includes applications 1240-1 to 1240-n for supporting various functions. For example, the application module 1240 may include program modules for providing various services such as a navigation program module, a game module, an e-book module, a calendar module, an alarm management module, etc. The applications may be installed as a default and may be arbitrarily installed and used by a user in use. If an object is selected, the CPU 230 may execute an application corresponding to the selected object using the application module 1240.

The software structure illustrated in FIG. 15 is an example, and exemplary embodiments are not limited thereto. Some of the components may be omitted, changed, or added. For example, the storage 310 may additionally store various programs such as a sensing module for analyzing signals sensed by various sensors, a messaging module of a messenger program, a text message program, and an e-mail program, etc., a call info aggregator program module, a VoIP module, and a web browser module, etc.

As described above, the user terminal device 1000 may be embodied as various types of apparatuses such as a mobile phone, tablet PC, laptop PC, PDA, MP3 player, e-album device, TV, PC, kiosk, etc. Accordingly, the configuration described above with reference to FIGS. 14 and 15 may be modified in various ways according to the type of the user terminal device 1000.

As described above, the user terminal device 1000 may be implemented in various forms and configurations. The processor 200 of the user terminal device 1000 may support various user interactions according to one or more exemplary embodiments.

Below, a user interaction method according to one or more exemplary embodiments will be described in detail.

According to an exemplary embodiment, the processor 200 may receive a signal to request execution of an application which is installed in the user terminal device 1000. For example, the processor 200 may receive data from an external device of the user terminal device 1000, receive a request for execution of an application from a user using a button or the touch screen 100 provided on the main body of the user terminal device 1000, or when an application is set to operate automatically in advance, receive a signal to request execution of the application.

In response to such a request signal, the processor 200 may display a UI of the application on the touch screen 100. Specifically, in response to the request signal, the processor 200 may display the application either in a first layout or a second layout. In this case, the first layout may refer to a display layout of an auxiliary display area of the touch screen 100, and the second layout may refer to a display layout of a main display area of the touch screen 100.

Specifically, if an event to display information to a user (e.g., display a notification message) occurs, the processor 200 may determine whether to display the corresponding information on a main display area or an auxiliary display area in advance. For example, if a user is located at a theater or a library, the processor 200 may determine the location of the user through the above-described GPS 320, and determine that a corresponding message is displayed on an auxiliary display area. In this case, the processor 200 may control the touch screen 100 so that no information is displayed on the main display area, that is, a black screen is displayed on the main display area while information is displayed on the auxiliary display area.

The processor 200 may determine a display area based on the time for displaying information. For example, if a SMS message or a SNS alarm is used at night, the processor 220 may control the touch screen 100 to display the corresponding information only on an auxiliary display area rather than a main display area.

The processor 200 may determine a display area based on a disposition direction of a user terminal device. For example, if the user terminal device is used in a horizontal direction, it is more convenient for a user to read if a notification message is displayed in the horizontal direction. Accordingly, the processor 200 may control the touch screen 100 so that information is usually displayed on a main display area, but when the user terminal device is disposed in the horizontal direction, notification information is displayed in an auxiliary display area.

The processor 200 may determine a display area based on the type of application corresponding to an event. For example, the processor 200 may determine that notification of an application such as SMS is displayed on an auxiliary display area and notification of an application such as SNS is displayed on a main display area. Such method may be set by a manufacturer as a default, or may be set or changed through a user setting.

The processor 200 may determine a display area according to information amount to be displayed. The information amount may be represented by the size of data constituting the information or the length of texts constituting the information. For example, if the number of characters that can be displayed on an auxiliary display area is 20, the processor may determine that a message with less than 20 characters is displayed on an auxiliary display area and a message with more than 20 characters is displayed on a main display area. The number of characters, 20, is only an example, and it may vary according to a number of factors, including the size of the auxiliary display area, the font size of information displayed on the auxiliary area, etc.

If the user terminal device 1000 has a plurality of auxiliary display areas and it is determined that information corresponding to a predetermined event is displayed on an auxiliary display area, the processor 200 may determine an auxiliary display area in which the above information is to be displayed from among a plurality of auxiliary display areas. The event may refer to a situation in which information is to be displayed. For example, a situation in which SMS, SNS, etc., is received. The information corresponding to the event may be displaying that the corresponding information is to be displayed (e.g., when SMS is received, displaying a notification that the SMS is received without displaying the contents of the SMS) or information which is received (e.g., when SMS is received, displaying the contents of the SMS).

If the information to be displayed does not include direction information, the processor 200 may display the received information on an auxiliary display area that is set as a default. On the other hand, if the information to be displayed includes direction information, the information may be displayed on an auxiliary display area corresponding to the direction.

If the current state of the user terminal device 1000 is a first layout display state, the processor 200 may display an application on an auxiliary display area of the touch screen 100 in the first layout. In this case, the application may be displayed on full area of the auxiliary display area or on part of the auxiliary display area. Alternatively, an application UI may be displayed on both of the main display area and the auxiliary display area, or part of the executed application UI may be displayed only on the auxiliary display area.

Figure 16A:
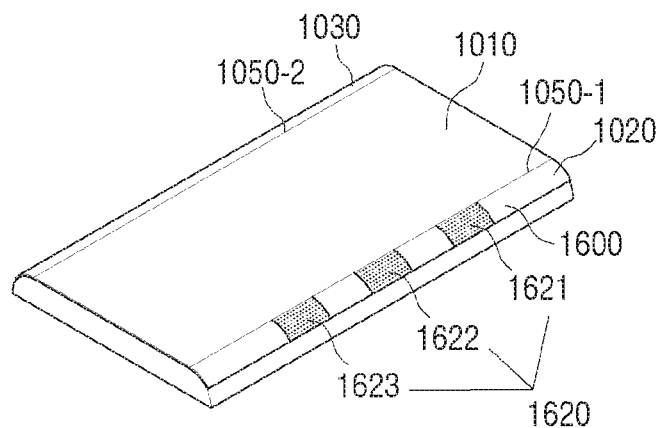
FIG. 16A is a view illustrating a layout of a main display area and an auxiliary display area, according to an exemplary embodiment.

FIG. 16A is a view illustrating an example of a layout, according to an exemplary embodiment. Referring to FIG. 16A, a screen is displayed in the first layout on the auxiliary display area 1020 of the touch screen and a screen is displayed in the second layout on the main display area 1010. The layout refers to information regarding the size, shape, disposition location, disposition order, etc., to display various information.

The first layout 1620 is divided into a plurality of areas 1621, 1622, 1623. Below, for convenience of explanation, the plurality of divided areas 1621, 1622, 1623 are referred to as auxiliary touch areas.

The auxiliary touch area refers to an area for processing a touch gesture with respect to a corresponding area to an input of a predetermined button, and if a user touches an auxiliary touch area, it is regarded not just as a gesture of selecting a UI displayed on the corresponding area but as an input of a specific button which is mapped to the corresponding area, an example of which will be described below with reference to FIG. 35.

According to an exemplary embodiment, if a user touches a part for inputting a character, the processor 200 may display a virtual keyboard for inputting characters. The processor 200 may control the touch screen 100 to display a UI of the application which is currently in operation and a virtual keyboard on a main display area. The virtual keyboard is a touch UI for receiving characters such as texts, etc., from a user, and may be provided in various forms such as a qwerty keyboard, a two sets type keyboard, a three sets type keyboard, a number keypad, a Cheonjiin keyboard, etc. In addition, the virtual keyboard may be a handwriting input area for receiving handwriting directly from a user.

When the virtual keyboard is displayed on a main display area, the processor 200 may display a function icon on an auxiliary display area. The processor 200 may display a function icon on an auxiliary display area on the left side and/or right side of the area in which the virtual keyboard is displayed.

The function icon is an icon to expand the functions of the virtual keyboard that is currently displayed. The function icon may be an emoticon, a special character, a predetermined set of characters, a function key to perform specific functions, etc. The user terminal device 1000, according to an exemplary embodiment, provides function icons to expand keyboard functions on an auxiliary display area, and thus, a user may more easily input characters.

The function icons may be provided in a single set, or may be provided in a plurality of sets. Different function icons may be displayed according to the type of application. Accordingly, the processor 200 may display function icons corresponding to the application which is currently in operation on an auxiliary display area. In addition, different function icons may be provided according to the type of virtual keyboard. For example, in the case of a Korean keyboard (e.g., a two sets type keyboard), a first function icon set may be displayed, and in the case of an English keyboard (for example, a qwerty keyboard), a second function icon set may be displayed.

For a user to touch function icons easily, the processor 200 may display the function icons only on the left side area and/or the right side area of the virtual keyboard. If it is difficult to display all of the preregistered icons on the left side area and the right side area of the virtual keyboard, i.e., if the number of registered function icons exceeds a predetermined number, then the processor 200 may display a predetermined number of the preregistered plurality of function icons by arranging them according to a usage frequency, recent usage record, etc.

If a user inputs a predetermined touch gesture with respect to an auxiliary display area, the processor 200 may display a function icon different from the function icon which is currently in operation (e.g., an icon which is not displayed among preregistered icons with respect to the corresponding application).

If a user selects a function icon displayed on an auxiliary display area, the processor 200 may display a character corresponding to the function icon, a set of characters, an emoticon, etc., on a character input window of a main display area. If the function icon selected by the user is a function key to perform a specific function, the processor 200 may perform the function corresponding to the icon.

According to an exemplary embodiment, if a talkback function (e.g., a voice output function) is requested from a user, the processor 200 may perform an operation according to the talkback function. The talkback function refers to the function of outputting information regarding a UI displayed on a main display area through voice, and helps a visually-impaired person use a user terminal device. A visually-impaired person may select a specific area without visual information, and thus, if the talkback function is activated, a touch gesture and a function corresponding to the touch gesture may be different than if talkback function is not activated.

When the talkback function is activated, the processor 200 may perform different functions according to each area in which a touch gesture is performed with respect to the same touch gesture. The processor 200 may perform a function regarding a general talkback function with respect to a first touch gesture on a main display area (e.g., if the first touch gesture is a touch, performing a reading function), and perform a general function with respect to the first touch gesture on an auxiliary display area (e.g., the same function before the talkback function is activated; for example, if the first touch gesture is a touch, performing a selection function), which will be described below with reference to FIGS. 24 to 34.

According to an exemplary embodiment, the processor 200 may process a touch gesture with respect to a plurality of auxiliary touch areas as an input of a predetermined button. The processor 200 may utilize a divided auxiliary touch area in the same manner as a touch area on a lock screen. If a touch gesture which passes a plurality of auxiliary display areas is sensed, the processor 200 may compare the auxiliary touch area corresponding to the touch gesture with preregistered lock screen locking information to release a locking function of a user terminal device, which will be described below with reference to FIG. 36.

The processor 200 may process a divided auxiliary touch area as an input of a six braille points keyboard. Specifically, braille points may be represented as six dots, and six auxiliary touch area positions may be mapped to six dots and the processor 200 may process a touch gesture with respect to the six auxiliary touch areas as an input of six braille points keyboard, which will be described below with reference to FIGS. 37 to 39.

The processor 200 may utilize a touch gesture with respect to a divided auxiliary touch area as a quick button to perform a predetermined operation. If touch gestures with respect to at least two touch areas from among a plurality of auxiliary touch areas are sensed simultaneously, the processor 200 may regard it as an operation of an application corresponding to the plurality of auxiliary touch areas in which the touch gestures are sensed or execution of a specific function and perform the corresponding operation, which will be described below with reference to FIG. 40.

According to an exemplary embodiment, if ambient sound near the user terminal device 1000 is sensed through the microphone 370, the processor 200 may display information regarding the direction of the sensed sound. A person with hearing impairment may not hear ambient sound. In this case, when preregistered sound is sensed, the processor 200 may control the touch screen 100 to display information regarding the sensed sound and/or information regarding the direction of the sound on a main display area and/or an auxiliary display area, which will be described below with reference to FIGS. 41 and 42.

According to an exemplary embodiment, if information is received from another terminal device through the communicator 330, the processor 200 may control the touch screen 100 to display the received information. The processor 200 may sense the position direction of the another terminal device and display the information regarding the sensed position direction on an auxiliary display area. If the received information includes order information, the processor 200 may map a plurality of touch areas to the order information and provide a user within information corresponding to the plurality of touch areas only. In addition, if the user touches an area displaying information, the processor 200 may control the touch screen 100 to display more detailed information than the information provided on the corresponding display area on a main display area, which will be described below with reference to FIGS. 43 to 47.

Figure 48:
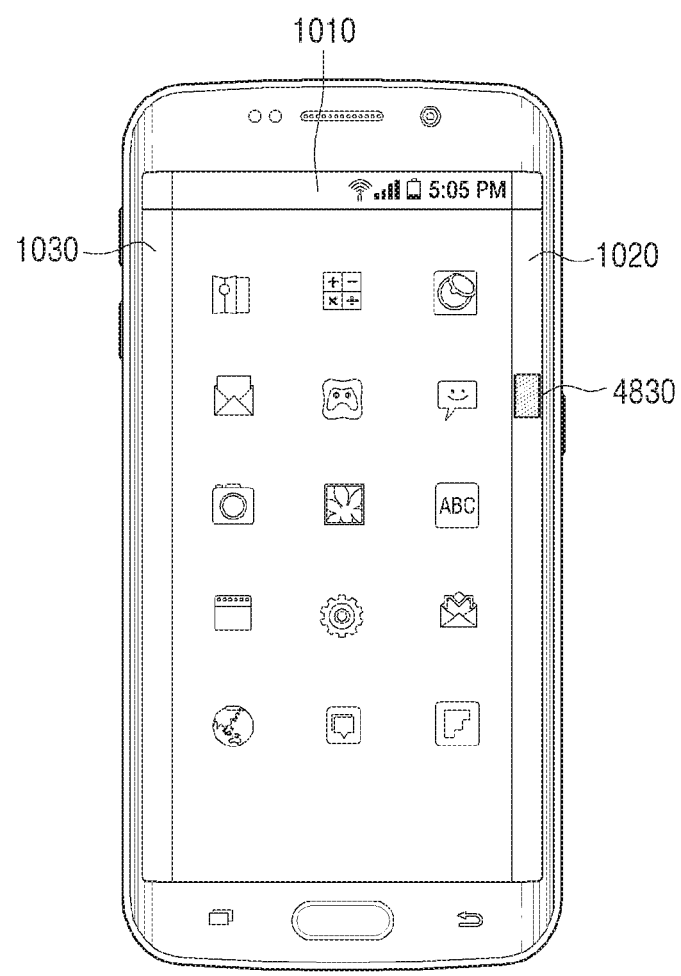
Figure 49:
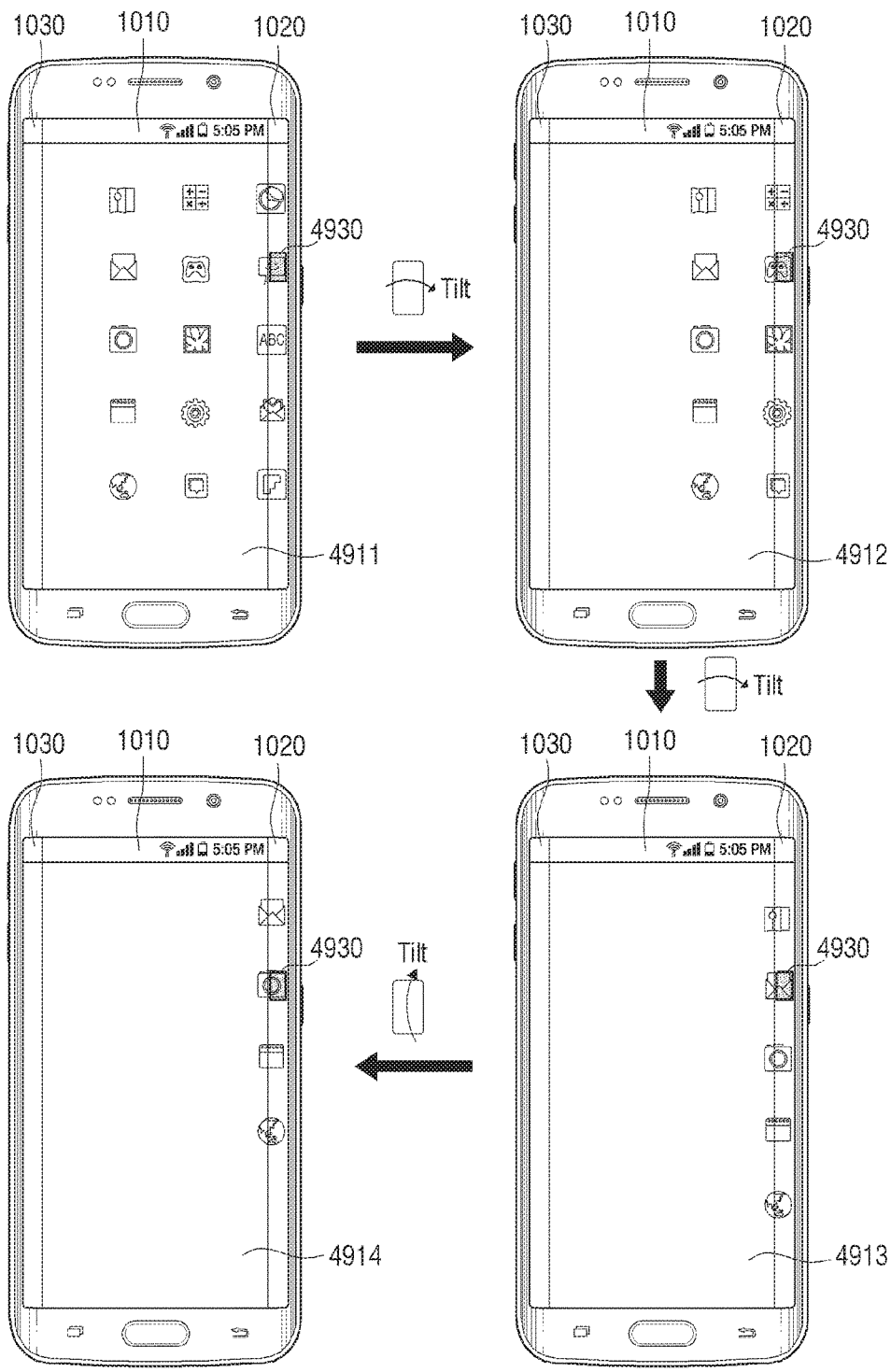
Figure 50:
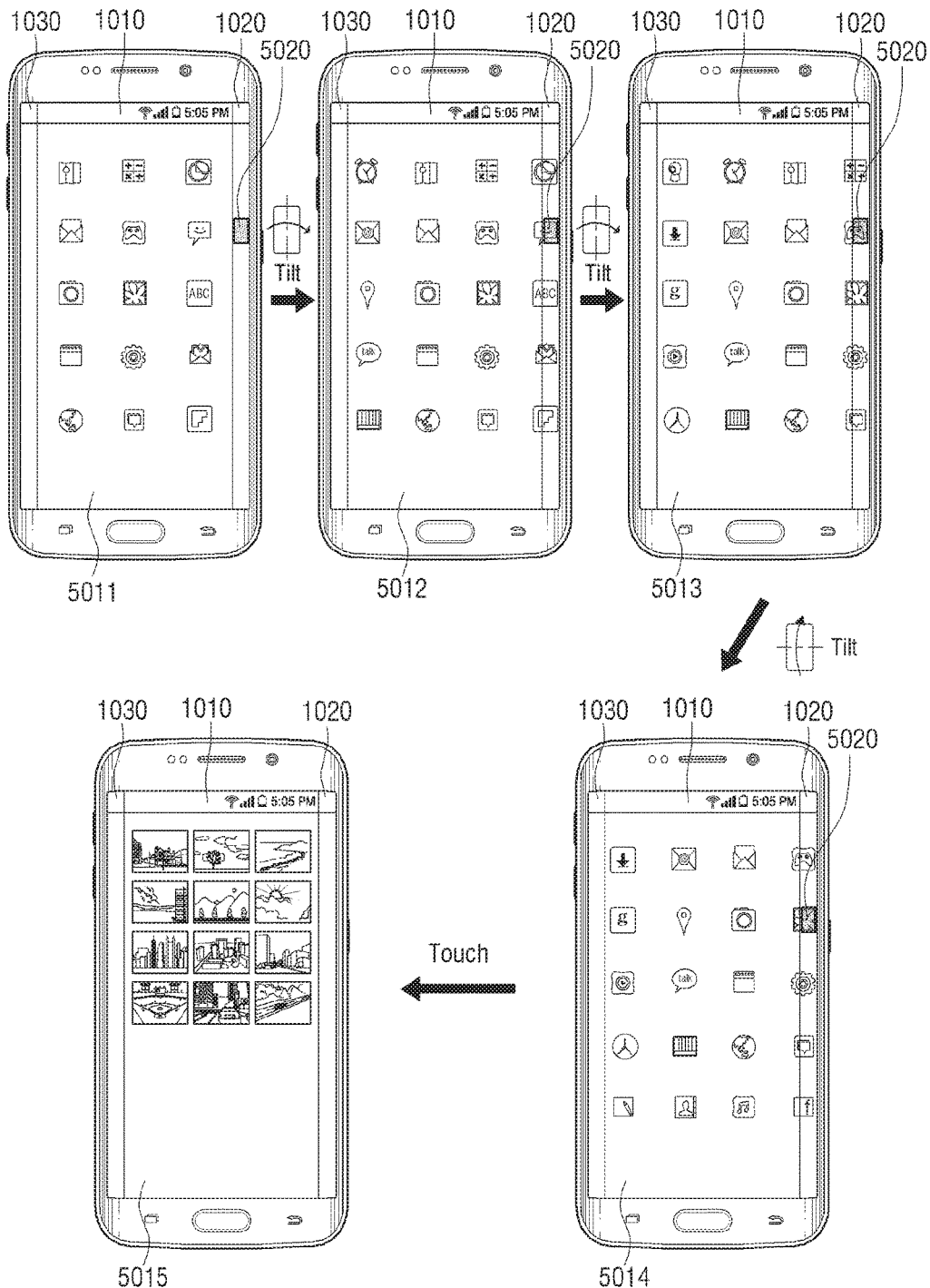

According to an exemplary embodiment, if a specific event occurs, the processor 200 may control a touch screen to display a plurality of icons on a main display area, and in response to a sensed movement of the user terminal device 1000, to move and display the displayed plurality of icons on the main display area and the auxiliary display area, and to display a UI regarding an application corresponding to an icon which is located at a predetermined area of the auxiliary display area on the main display area, which will be described below with reference to FIGS. 48 to 50.

As described above, the user terminal device 1000 according to an exemplary embodiment may provide various information using an auxiliary display area. Thus, a user may be provided with much more information. If an auxiliary display area which can be physically identified is used, the user may perform an interaction more easily.

Figure 16B:
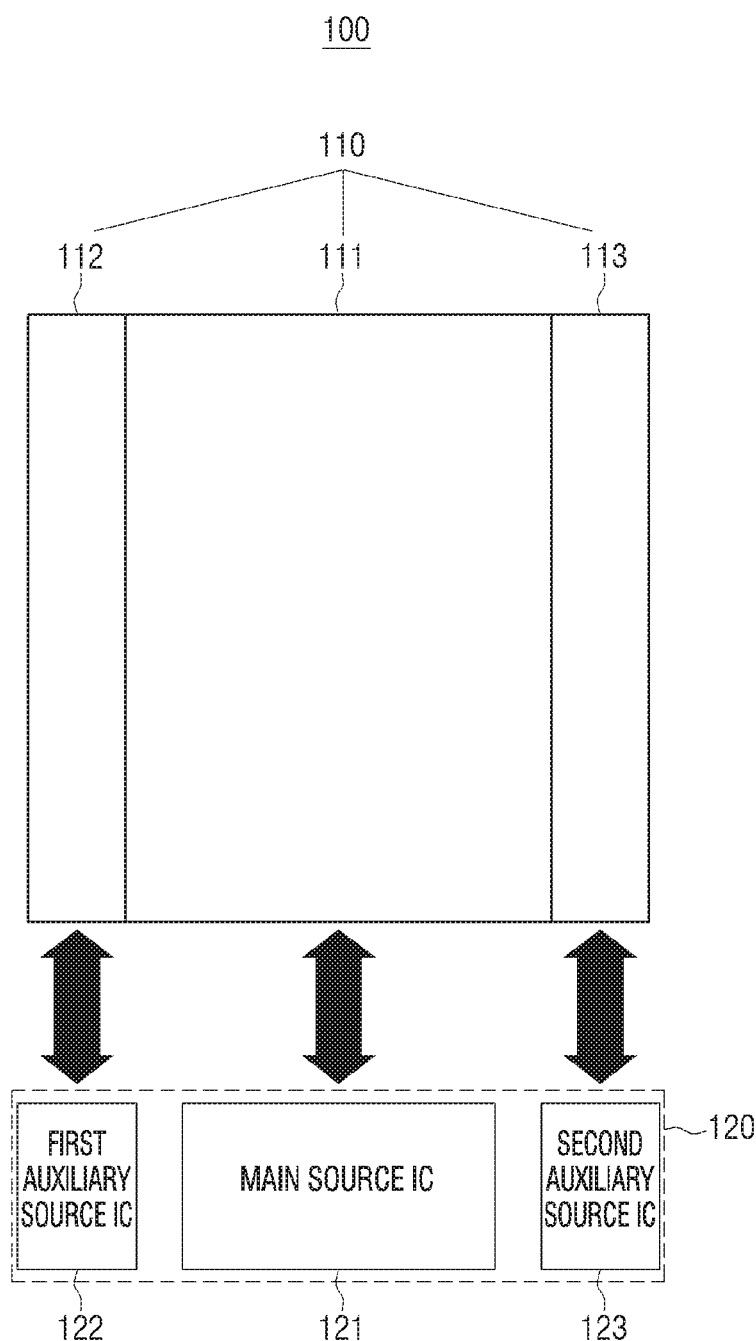
FIG. 16B is a view illustrating a configuration of a touch screen, according to an exemplary embodiment.

FIG. 16B is a view illustrating a configuration of a touch screen, according to an exemplary embodiment.

Referring to FIG. 16B, the touch screen 100 consists of a panel area 110 and a driver 120.

The panel area 110 consists of a panel with a plurality of pixels. Such a panel may be a display in various forms such as Liquid Crystal Display (LCD), Organic Light Emitting Diodes (OLED) display, Plasma Display Panel (PDP), etc. On one side of the panel area 110, a touch sensing electrode to sense a user's touch may be disposed. According to an exemplary embodiment, a panel area is separated from a touch sensing electrode, but according to another exemplary embodiment, a touch sensing electrode may be included in a panel area.

The panel area 110 may be divided into a main panel area 111, a first auxiliary panel area 112, and a second auxiliary panel area 113, according to the type of disposition. According to an exemplary embodiment, each panel area may be a separate panel that is divided physically.

The main panel area 111 is a physical display element corresponding to the main display area 1010 and may have, for example, 1440*2560 pixels. Each pixel may include three sub pixels (R/G/B). The main panel area 111 may receive a gate drive control signal and a source drive control signal to drive each sub pixel (sub pixels of a pixel corresponding to the main display area 1010) from a main source IC 121, and a transistor corresponding to each sub pixel is operated according to the received gate drive control signal and the source drive control signal. Accordingly, an image corresponding to the main display area 1010 may be displayed.

The first auxiliary panel area 112 is a physical display element corresponding to the first auxiliary display area 1020, and may have, for example, 160*2560 pixels. Each pixel may include three sub pixels (R/G/B). Accordingly, the first auxiliary panel area 112 may receive a gate drive control signal and a source drive control signal to drive each sub pixel (sub pixels of a pixel corresponding to the first auxiliary display area 1020) from a first auxiliary source IC 122, and a transistor corresponding to each sub pixel is operated according to the received gate drive control signal and the source drive control signal. Accordingly, an image corresponding to the first auxiliary display area 1020 may be displayed.

The second auxiliary panel area 113 is a physical display element corresponding to the second auxiliary display area 1030, and may have, for example, 160*2560 pixels, and the configuration of each pixel and the image display method may be the same as the above-described configuration and method with respect to the first auxiliary display panel 112.

The source IC 120 provides a drive control signal to drive pixel in the panel area 110. The source IC 120 may consist of a main source IC 121, a first auxiliary source IC 122, and a second auxiliary source IC 123.

The main source IC 121 is a Display Driver IC (DDI) to drive the main panel area 111. The main source IC 121 may receive a drive control signal corresponding to an image which is to be displayed on the main display area 1010, generate a gate drive control signal and a source drive control signal corresponding to the received control signal and provide the signals to the main panel area 111. The DDI is a chip which is used to drive a number of pixels constituting a display such as LCD, PDP, etc., and adjusts a transistor of each sub pixel displaying RGB in pixels of the display. According to an exemplary embodiment, a main source IC may be realized as a plurality of ICs such as a main gate IC, a main source IC, etc.

The first auxiliary source IC 122 is a DDI to drive the first auxiliary display panel 112. The first auxiliary source IC 122 may receive a drive control signal corresponding to an image which is to be displayed on the first auxiliary display area 1020, generate a gate drive control signal and a source drive control signal corresponding to the received drive control signal, and provide the signals to the first auxiliary panel area 112.

The second auxiliary source IC 123 is a DDI to drive the second auxiliary panel area 113. The second auxiliary source IC 123 may receive a drive control signal corresponding to an image which is to be displayed on the second auxiliary display area 1030, generate a gate drive control signal and a source drive control signal corresponding to the received drive control signal, and provide the signals to the second auxiliary panel area 113.

The first auxiliary source IC 122 and the second auxiliary source IC 123 may receive data address that the main source IC 121 reads out directly or through an AP. If an icon which is being displayed on the main display area 1010 moves to the auxiliary display areas 1020, 1030, a memory address storing data corresponding to the icon is transmitted to the first auxiliary source IC 122 or the second auxiliary source IC 123, and the first auxiliary source IC 122 or the second auxiliary source IC 123 may receive data corresponding to the icon from the corresponding address to drive the auxiliary panel areas 112, 113.

In the above description regarding FIG. 16B, a source IC consists of three ICs, but according to one or more exemplary embodiments, a source IC may consist of two or less ICs (for example, the first auxiliary source IC and the second auxiliary source IC) or four or more ICs.

Below, examples of various interactions will be described with reference to FIG. 17 to FIG. 50. For convenience of explanation, a display screen which is displayed for a user will be referred to as a screen (or a user interface window), and layout elements constituting the corresponding screen will be referred to as a UI. The screen may include a plurality of UIs or only one UI. The UI may include one UI element (e.g., text, image, rendering object, etc.) or a plurality of UI elements.

Figure 17:
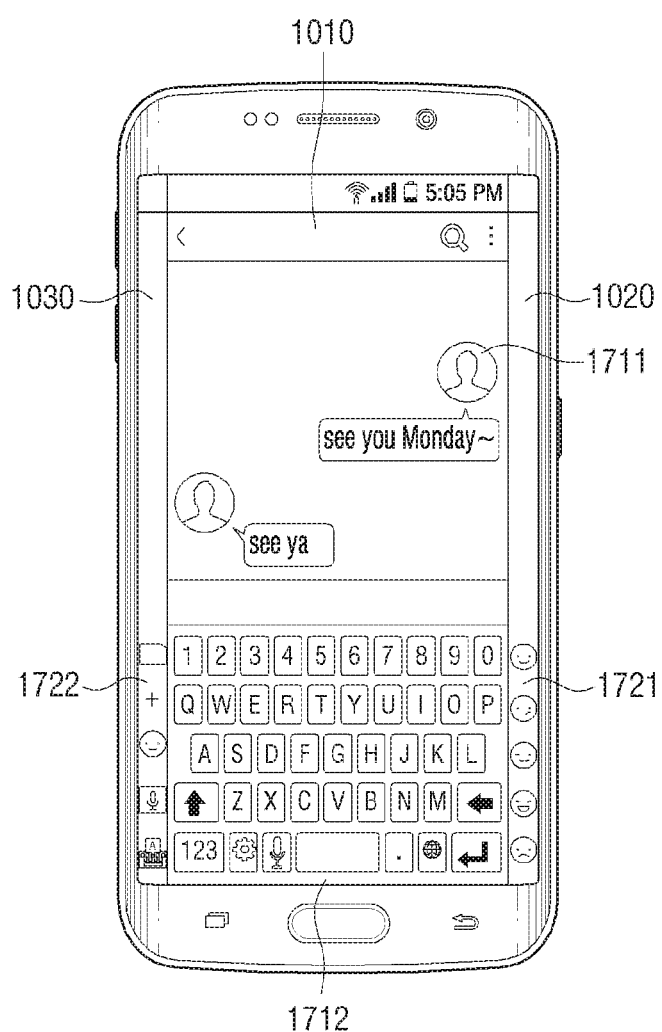

FIG. 17 is an example of a user interface window which can be displayed when a virtual keyboard is activated.

Referring to FIG. 17, a user interface window includes the main display area 1010 and the auxiliary display areas 1020, 1030.

The main display area 1010 includes a UI 1711 of an application (for example, SNS) which is currently in operation and a virtual keyboard 1712. The virtual keyboard may be disposed on a predetermined area of the main display area 1010, for example, in the lower part of the main display area 1010. FIG. 17 illustrates a virtual keyboard in a qwerty method, but any type of keyboard UI may be displayed. According to an exemplary embodiment, not only may a virtual keyboard be displayed to receive a predetermined set of characters such as emoticon, text, etc., a handwriting input area to receive handwriting directly from a user may also be displayed on the main display area 1010.

Each of the auxiliary display areas 1020, 1030 displays a plurality of function icons 1721, 1722. The plurality of function icons 1721, 1722 are disposed on the left side and the right side areas of the virtual keyboard 1712. That is, within the area in which a user's thumb can be reached, and thus, the user may select the function icons easily while typing on the virtual keyboard.

Figure 18:
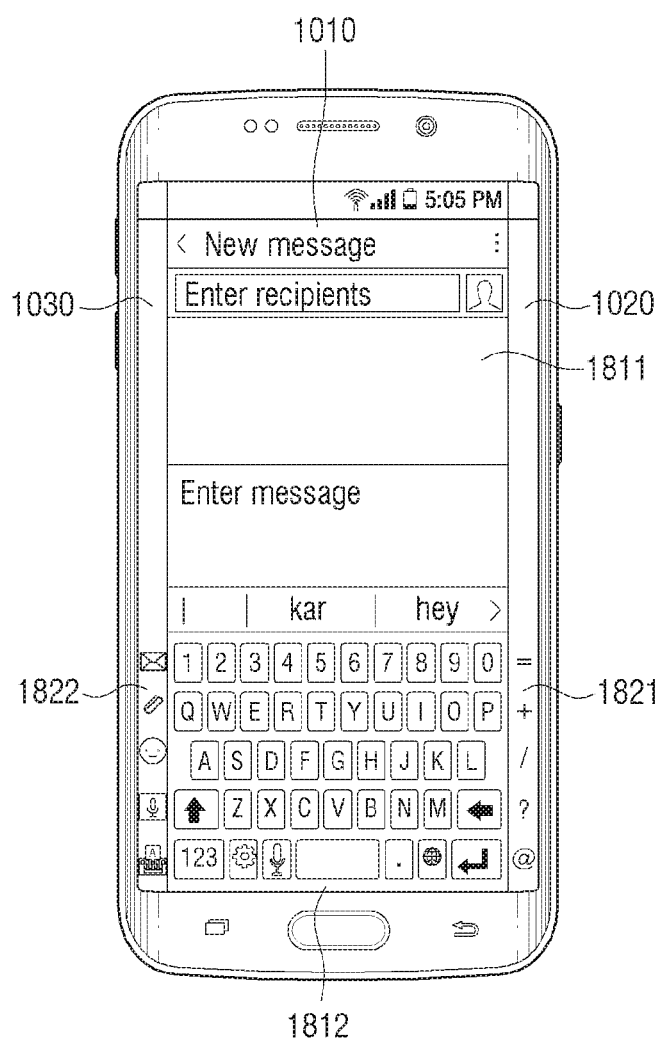

FIG. 18 is an example of another user interface window which can be displayed when a virtual keyboard is activated.

Referring to FIG. 18, a user interface window includes the main display area 1010 and the auxiliary display areas 1020, 1030.

The main display area 1010 includes a UI 1811 of an application (e.g., SMS) which is currently in operation and a virtual keyboard 1812. The virtual keyboard 1812 may be disposed on a predetermined area of the main display area 1010, for example, in the lower part of the main display area 1010. FIG. 18 illustrates a virtual keyboard in a qwerty method, but any type of keyboard UI may be displayed.

Each of the auxiliary display areas 1020, 1030 displays a plurality of function icons 1821, 1822. The plurality of function icons 1821, 1822 may be configured as function icons for a SMS application.

Figure 19:
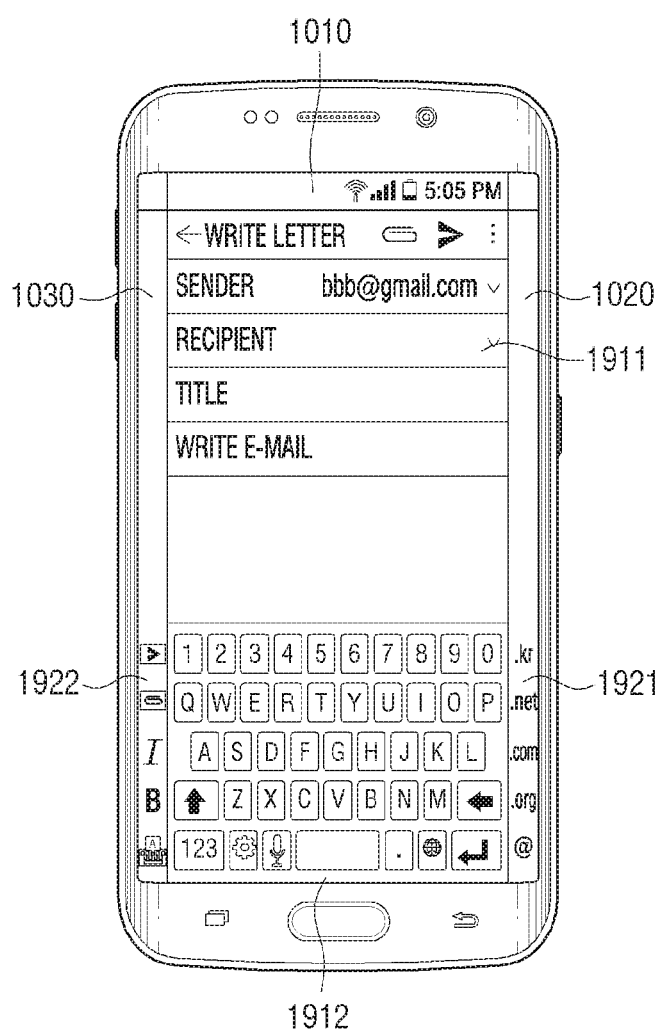

FIG. 19 is an example of another user interface window which can be displayed when a virtual keyboard is activated.

Referring to FIG. 19, a user interface window includes the main display area 1010 and the auxiliary display areas 1020, 1030.

The main display area 1010 includes a UI 1911 of an application (for example, mail) which is currently in operation and a virtual keyboard 1912. The virtual keyboard 1912 may be disposed on a predetermined area of the main display area 1010, for example, in the lower part of the main display area 1010. FIG. 19 illustrates a virtual keyboard in a qwerty method, but any type of keyboard UI may be displayed.

Each of the auxiliary display areas 1020, 1030 displays a plurality of function icons 1921, 1922. The plurality of function icons 1921, 1922 may include function icons for a mail application.

In the above description regarding FIGS. 17 to 18, a function icon is displayed on each of the auxiliary display areas 1020, 1030, but according to one or more exemplary embodiments, a function icon may be displayed only on one of the auxiliary display areas.

Figure 28:
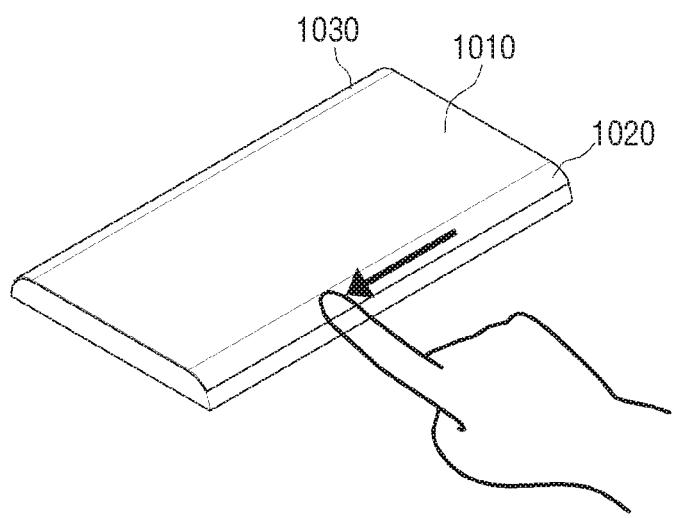

According to an exemplary embodiment, only five function icons are displayed, but more function icons may be registered with respect to each application. The processor 200 may arrange and display the function icons in consideration of execution frequency, recent execution history, etc., of each function icon. A user may input a command to display another function icon using a touch gesture as illustrated in FIG. 28, and the processor 200 may control the touch screen 100 to display a function icon which is not displayed on an auxiliary display area in which the touch gesture is input.

The number of function icons displayed on the left side and the right side may be the same, but the number of function icons displayed on the sides may be different from each other, and icons may be disposed on different areas depending on the properties of the function icons. For example, emoticons may be displayed only on the right auxiliary display area 1020, and function icons to perform specific functions may be displayed only on the left auxiliary display area 1030. However, according to an exemplary embodiment, the disposition order or examples of function icons displayed may be changed by a user, which will be described below with reference to FIGS. 20A and 20B.

Figure 20A:
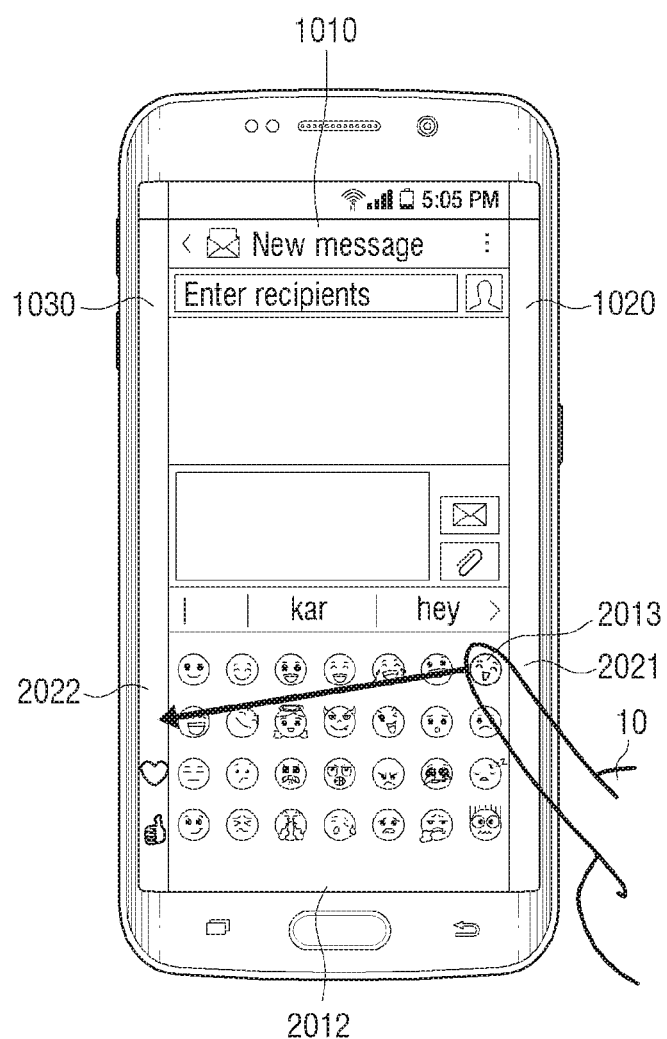
Figure 20B:
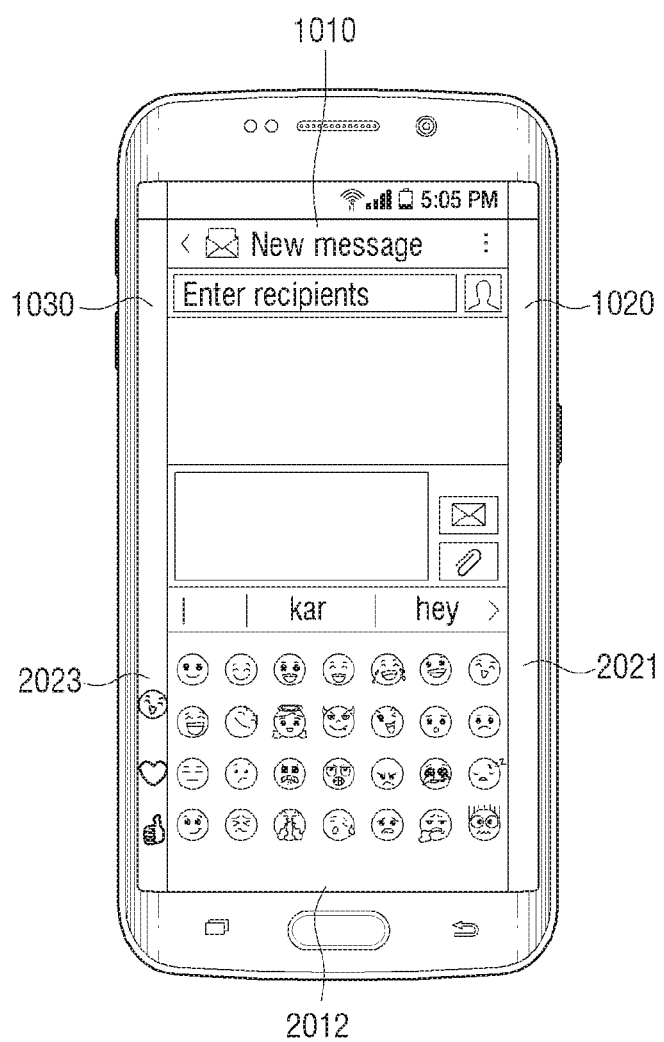

FIGS. 20A and 20B are examples of a user interface window for adding a function icon, according to an exemplary embodiment.

Referring to FIGS. 20A and 20B, a user interface window includes the main display area 1010 and the auxiliary display areas 1020, 1030, The main display area 1010 includes a UI of an application (for example, SMS) which is currently in operation and a virtual keyboard 2012.

If a user uses an emoticon 2013 displaying a smile from among emoticons displayed on the virtual keyboard 2012 frequently and wishes to register the emoticon 2013 as a function icon, the user may select the icons 2013 which is to be registered as a function icon from among the emoticons displayed on the virtual keyboard 2012 and place the emoticon 2013 on an auxiliary display area using a drag-and-drop method. When such a touch gesture is input, the processor 200 may determine that a function icon registration command with respect to the dropped icon is input and register the moved icon as a new function icon. Accordingly, referring to FIG. 20B, the icon selected by the user is included in a left auxiliary display area 2023.

In the above description regarding FIGS. 20A and 20B, the icon displayed on the main display area is the same as the icon displayed on the auxiliary display area; but the size, color, etc., of the icons may be different according to one or more exemplary embodiments, and the icons may be displayed in a different form.

Figure 21A:
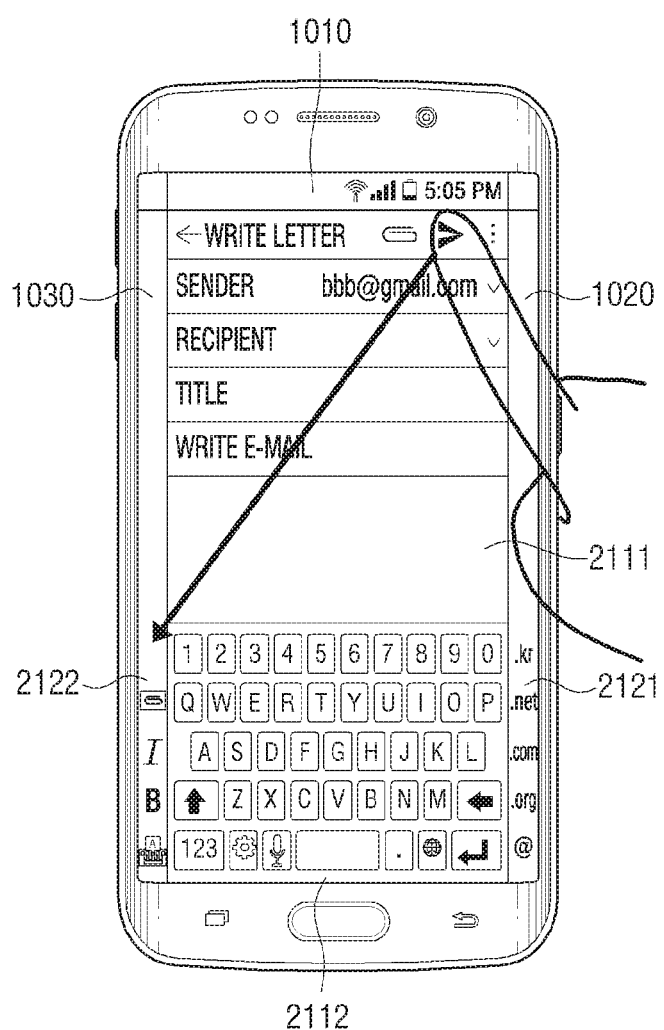
Figure 21B:
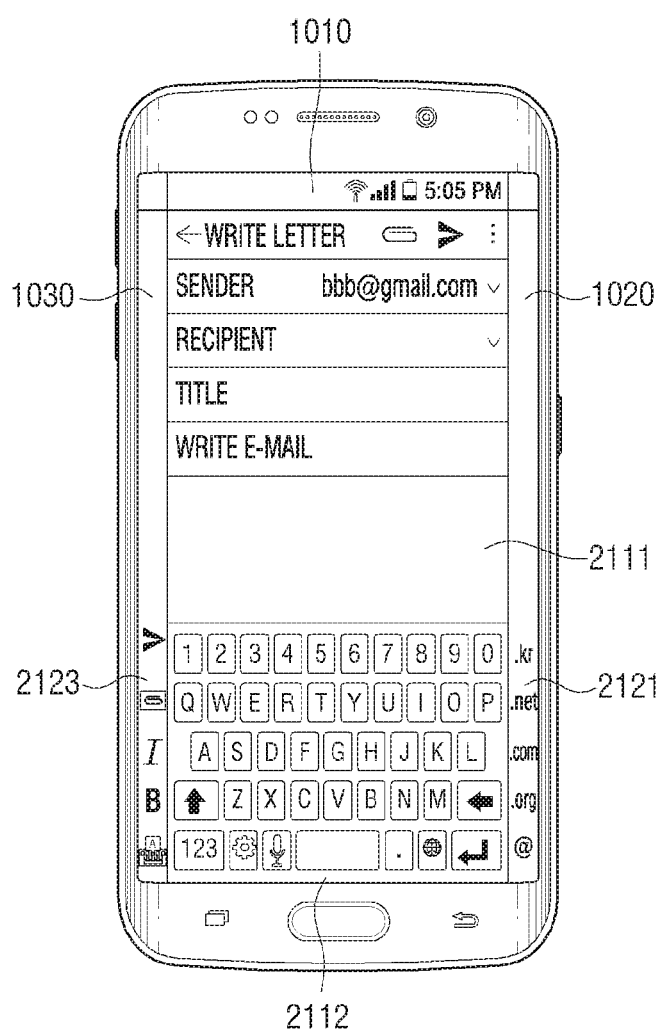

FIGS. 21A and 21B are examples of a user interface window for adding a function icon, according to an exemplary embodiment.

Referring to FIGS. 21A and 21B, a user interface window includes the main display area 1010 and the auxiliary display areas 1020, 1030.

The main display area 1010 includes a UI 2111 of an application (for example, mail) of an application which is currently in operation and a virtual keyboard 2112.

A user may move an icon on the application UI to an auxiliary display area using a drag-and-drop method. When such a touch gesture is input, the processor 200 may register a function on the UI, which is selected by the user as a function icon. If a function operates on a mail application, the processor 200 may register the corresponding function icon as a function icon of a mail application. Accordingly, referring to FIG. 21B, on a left auxiliary display area 2123, the UI area selected by the user includes the function icon.

Figure 22:
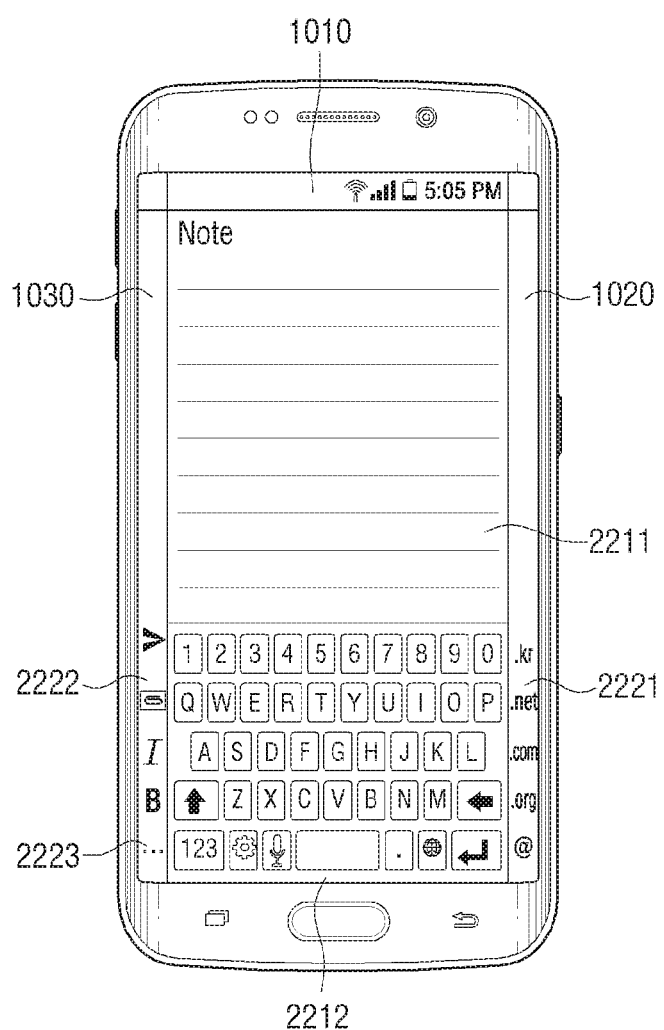
Figure 23:
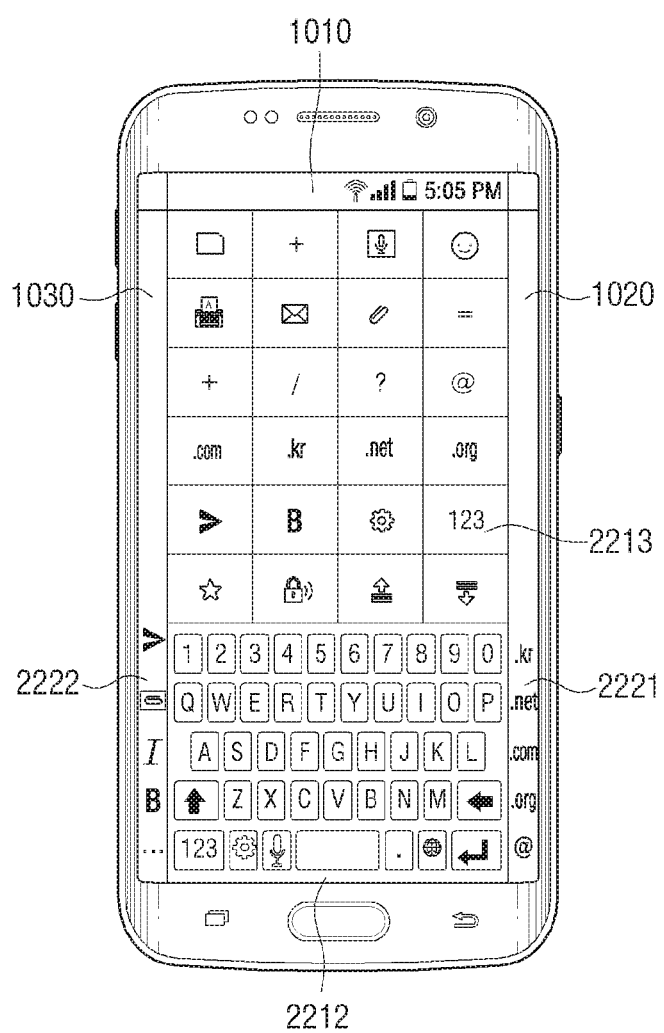

FIGS. 22 and 23 are examples of a user interface window for adding a function icon, according to an exemplary embodiment.

Referring to FIG. 22, a user interface window includes the main display area 1010 and the auxiliary display areas 1020, 1030.

The main display area 1010 includes a UI 2211 of an application (for example, a note-taking application) which is currently in operation and a virtual keyboard 2212.

Each of the auxiliary display areas 1020, 1030 displays function icons 2221, 2222 corresponding to the application on the left side and the right side of the virtual keyboard 2212.

The auxiliary display area 1030 includes a setting icon 2223 to add a function icon. When a user selects the setting icon 2223, the main display area may be changed as illustrated in FIG. 23.

Referring to FIG. 23, the user interface window may display a plurality of new function icons which can be registered in the main display area 1010. The new function icons may be icons related to the application (e.g., a note-taking application) that is currently in operation and/or icons related to the virtual keyboard 2212.

A user may select one of icons displayed on the main display area 1010, and register the selected icon as a function icon. Alternatively, as illustrated in FIGS. 20 and 21, a user may move one of the icons displayed on the main display area 1010 to the auxiliary display areas 1020, 1030 and register the moved icon as a function icon.

According to an exemplary embodiment, illustrated in FIGS. 22 and 23, when a user selects the setting icon 2223, a user interface window to register a new function icon is displayed as illustrated in FIG. 23, but according to an exemplary embodiment, function icons which are currently not displayed on the auxiliary display area from among registered icons may be displayed. In other words, when the setting icon in FIG. 22 is pressed, the icons which are not displayed on the auxiliary display areas 1020, 1030 from among currently-registered function icons may be displayed on the main display area 1010.

FIGS. 24 to 34 are views illustrating various touch gestures.

Figure 24:
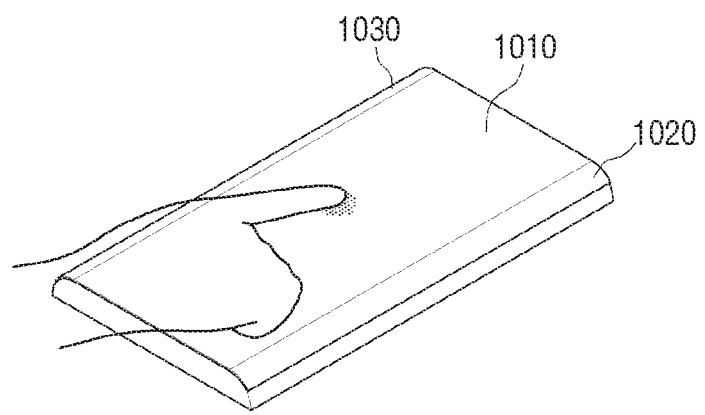

Referring to FIG. 24, a user may touch an area of the main display area 1010. In response to such a user touch, the processor 200 may perform a function corresponding to the touched area. For example, if the user touches an area in which an icon corresponding a specific application is disposed, a function to execute the application corresponding to the icon may be performed. If the area touched by the user is an area having a specific URL address, a function to move to a web page corresponding to the URL address may be performed. If a talkback function is activated, in response to a touch gesture, the processor 200 may perform the talkback function of outputting a text or a function corresponding to the touched area using sound.

Figure 25:
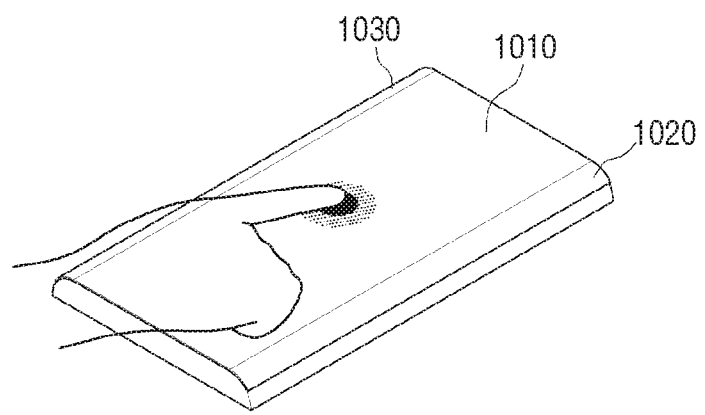

Referring to FIG. 25, a user may touch an area on the main display area 1010 two times (hereinafter, referred to as 'double touch') within a predetermined time interval. If a talkback function is activated, the processor 200 may perform a function corresponding to the area in which a double touch is input. For example, if the area which is double-touched by a user includes an icon corresponding to a specific application, a function to execute the application corresponding to the icon may be performed. If the area which is double-touched by the user has a specific URL address, a function to move to a web page corresponding to the URL address may be performed.

Comparing FIG. 24 and FIG. 25, the same function (e.g., to perform a function corresponding to a touch area) is operated by different gestures according to whether the talkback function is activated.

Figure 26:
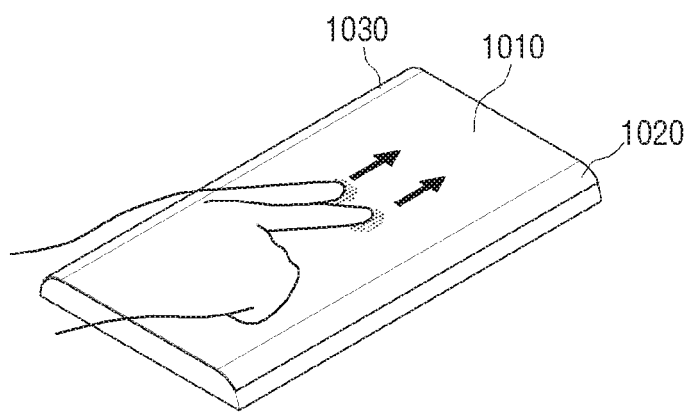

Referring to FIG. 26, a user may touch a plurality of areas on the main display area 1010, and input the gesture of scrolling in the same direction. If the talkback function is activated, the processor 200 may scroll a UI which is currently displayed on the main display area in a direction corresponding to the scroll direction of the user gesture and display the UI. Such a function operation may correspond to a touch and scroll operation with respect to one area while the talkback function is inactivated. According to an exemplary embodiment, two touches are used, however, three or more touches may be used.

Figure 27:
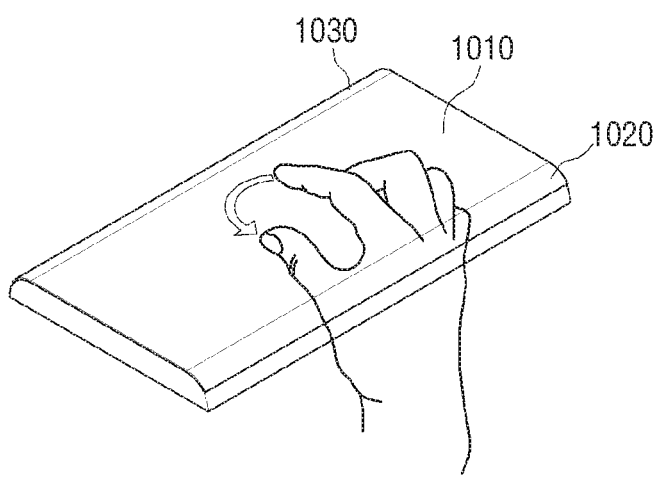

Referring to FIG. 27, a user may touch two areas on the main display area 1010, and input the gesture of scrolling in the direction of mutual rotation. If the talkback function is activated, the processor 200 may convert a UI which is currently displayed to a UI of another application, home screen, or list screen and display the same. The list screen is a screen on which the applications that the user has used recently are displayed in the form of list.

Referring to FIG. 28, a user may touch one area on the auxiliary display area 1020 and input the gesture of scrolling (e.g., sliding) in a horizontal direction. If the talkback function is inactivated, the processor 200 may perform the function of changing the UI displayed on the auxiliary display area and displaying the UI. For example, the processor 200 may change a function icon which is being displayed on the auxiliary display area to another function icon or change a widget which is being displayed on the auxiliary display area to another widget.

If the talkback function is activated, in response to the corresponding gesture, the processor 200 may scroll the UI on the main display area in the left/right direction and display the UI.

Figure 29:
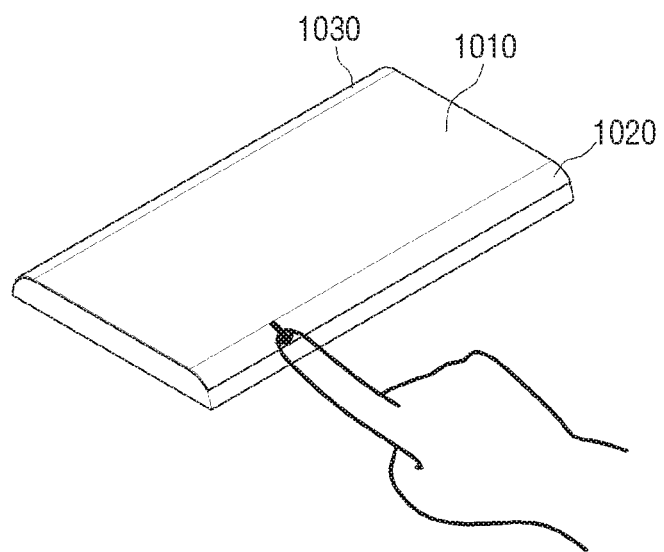

Referring to FIG. 29, a user may touch one area of the auxiliary display area 1020 and input the gesture of scrolling in a longitudinal direction. If the talkback function is inactivated, the processor 200 may perform the function of changing the UI displayed on the auxiliary display area and displaying the UI. For example, if a notification message is displayed on the auxiliary display area and a corresponding touch gesture is input, the display of the notification message may be stopped.

If the talkback function is activated, in response to the corresponding gesture, the processor 200 may scroll the UI displayed on the main display area and display the UI.

If the talkback function is activated and the corresponding gesture is performed on the main display area 1010, the processor 200 may not perform any particular operation. As such, according to an exemplary embodiment, different interaction for each area may be provided with respect to the same touch gesture, which will be described below in detail with reference to FIGS. 30 and 31.

Figure 30:
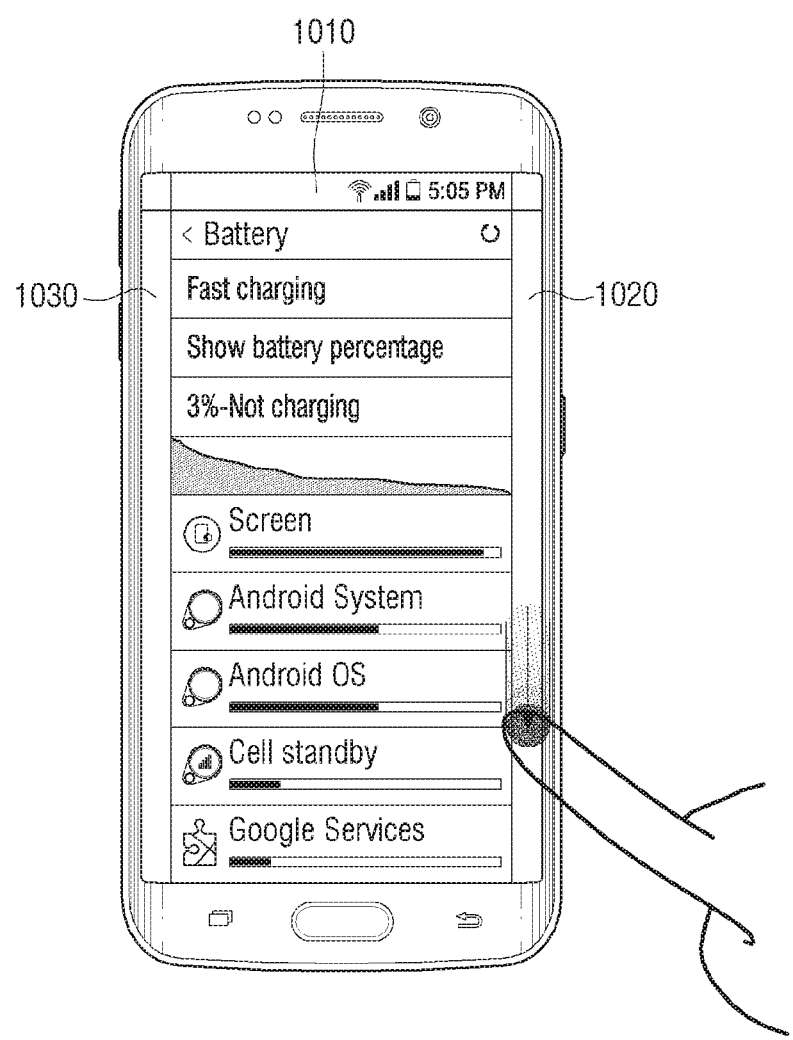

Referring to FIG. 30, a user interface window includes the main display area 1010 and the auxiliary display area 1020, 1030.

The main display area 1010 displays a UI of the application which is currently in operation. While the talkback function is inactivated, a user may scroll contents in the displayed UI by touching part of the main display area 1010 and inputting the touch gesture of scrolling.

If the talkback function is activated, another gesture may be used as illustrated in FIG. 26. According to an exemplary embodiment, the function of scrolling a UI may be provided not only by the touch gesture which has been described above with reference to FIG. 26 but also the existing touch gesture on the auxiliary display area.

Figure 31:
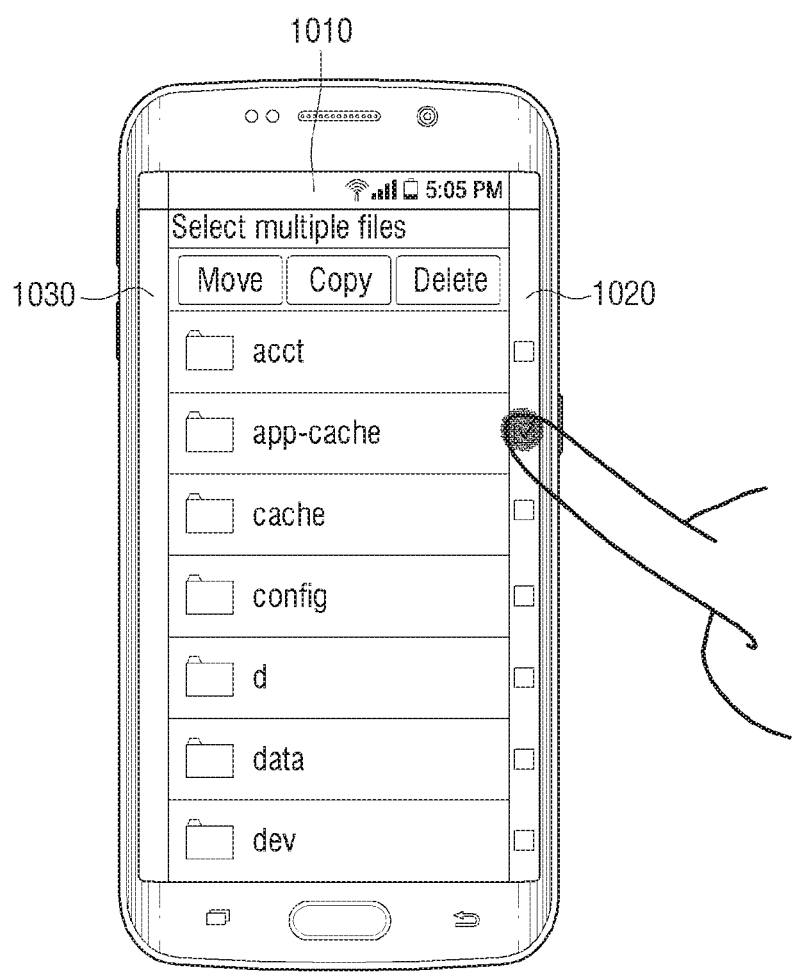

Referring to FIG. 31, the main display area 1010 displays a plurality of selection areas. While the talkback function is inactivated, a user may select a selection area easily by selecting the selection area on the main display area. However, in the state in which the talkback function is activated, to select the corresponding area, a user may need to hear through the talkback to see whether the selected area is a desired area and to input a gesture such as a double touch if the selected area is the desired area. According to an exemplary embodiment, in addition to the corresponding function, the corresponding selection area is expanded and displayed on the auxiliary display area. Thus, even when the talkback function is activated, a user may perform a selection operation only through the operation of selecting the selection area displayed on the auxiliary display area.

Figure 32:
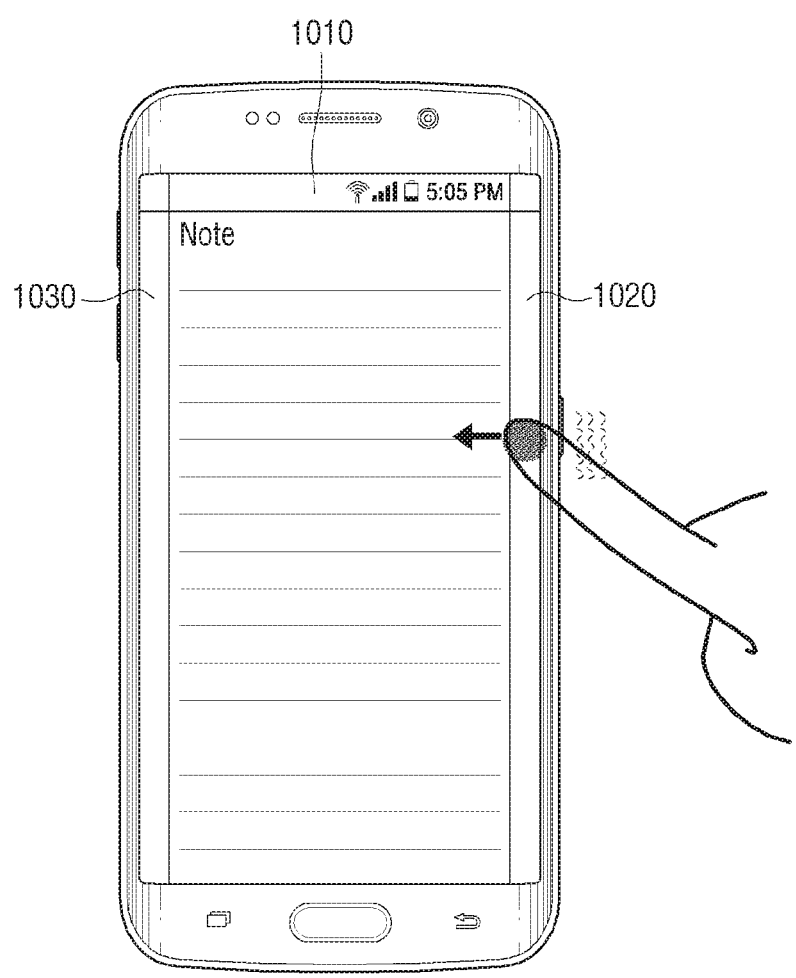

Referring to FIG. 32, a user may input a touch scroll gesture towards the main display area 1010 on the auxiliary display area 1020. The processor 200 may generate haptic in response to the touch on the auxiliary display area and perform a backspace function. For example, if the above-described touch scroll gesture is input while the contents of the UI which is currently displayed is a web page, the processor 200 may control the touch screen to display the previous web page which was displayed before the current web page. If the currently-displayed UI is a screen which displays contents in hierarchical folders, the processor 200 may control the touch screen to display contents in an upper folder from among the currently-displayed folders in response to the above-described touch scroll gesture.

Figure 33:
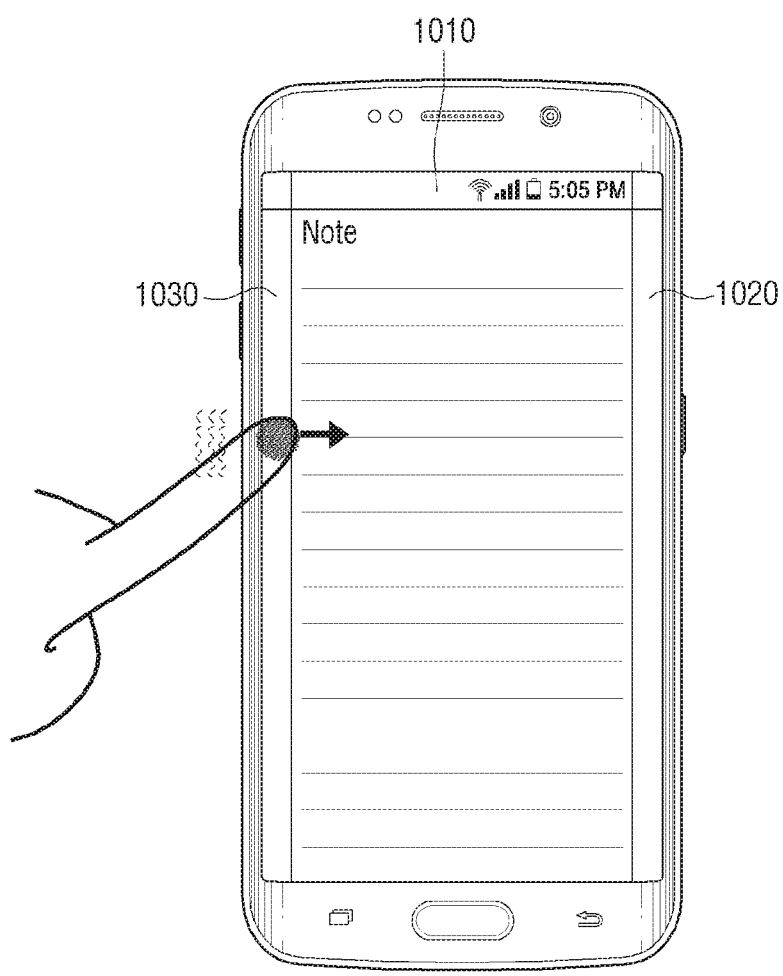

Referring to FIG. 33, a user may input a touch scroll gesture towards the main display area 1010 on the auxiliary display area 1030. In this case, the processor 200 may generate haptic in response to the touch on the auxiliary display area, and control the touch screen 100 to display a UI of an application which is different from the currently-displayed application.

The another application which is displayed may be an application which the user used right before he or she used the current application. For example, if the user uses applications A, B and C sequentially and then, inputs the above-described touch scroll gesture, the processor 200 may convert the UI corresponding to application C to the UI corresponding to application B. The above-described another application may be a predetermined specific application regardless of the user's usage history. For example, if the user sets a music application as a specific application in advance and the user inputs the above-described touch scroll gesture, the processor 200 may control the touch screen 100 to display a UI corresponding to the music application.

Figure 34:
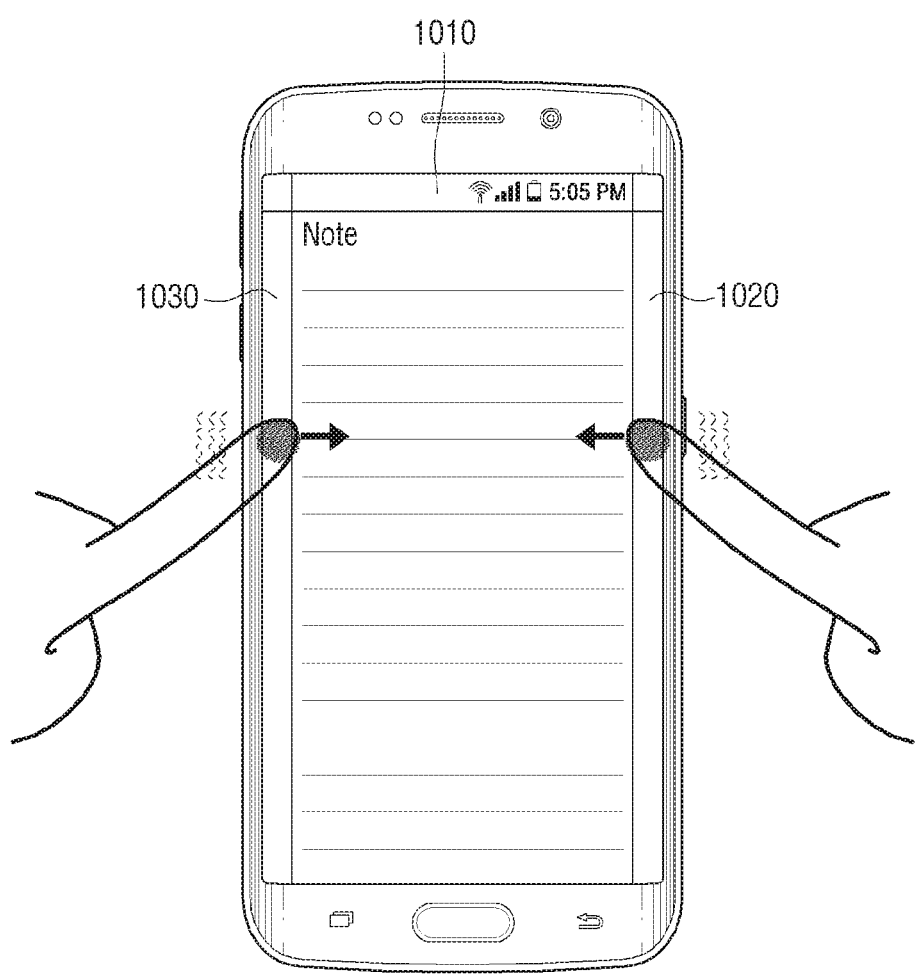

Referring to FIG. 34, a user may touch each of the auxiliary display areas 1020, 1030, and input a touch scroll gesture towards the main display area 1010 regarding both of the two touch areas. The processor 200 may control the touch screen 100 to terminate the application which is currently in operation and display a home screen. According to an exemplary embodiment, a UI of another application, not the home screen (for example, the application which the user used shortly before or the application which is set as a default), may be displayed. If the current application is an application which may have a number of pages therein (for example, a web browser), the currently-displayed page (for example, a web page) may be closed and another page (or a list of favorites) may be displayed.

Figure 35:
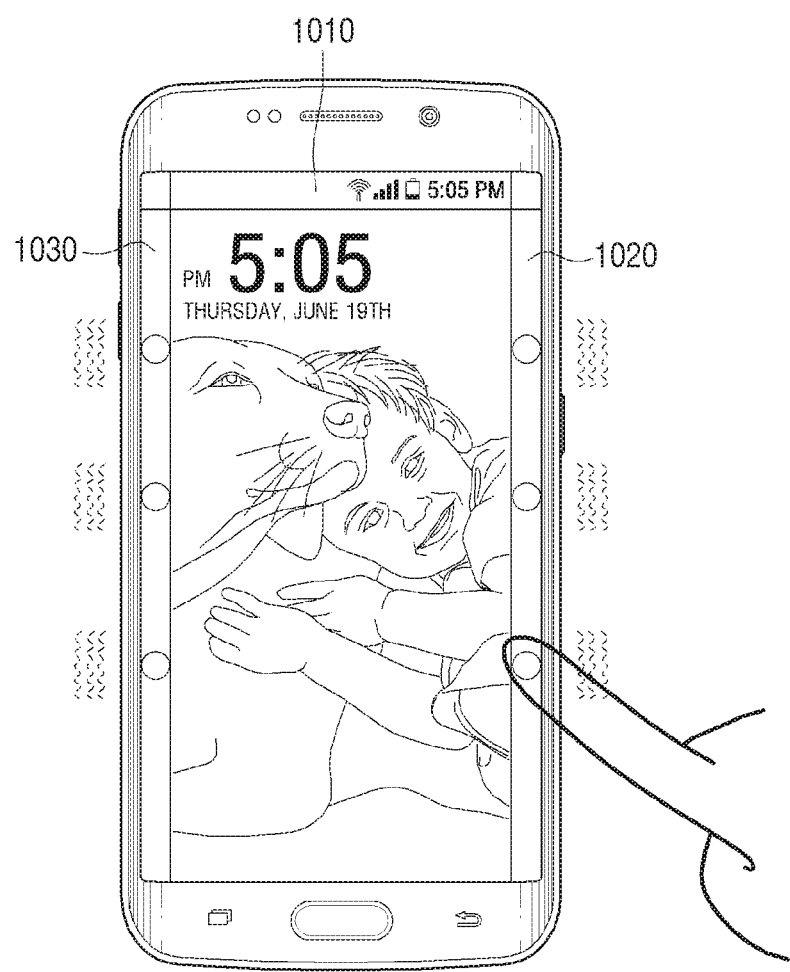
Figure 36:
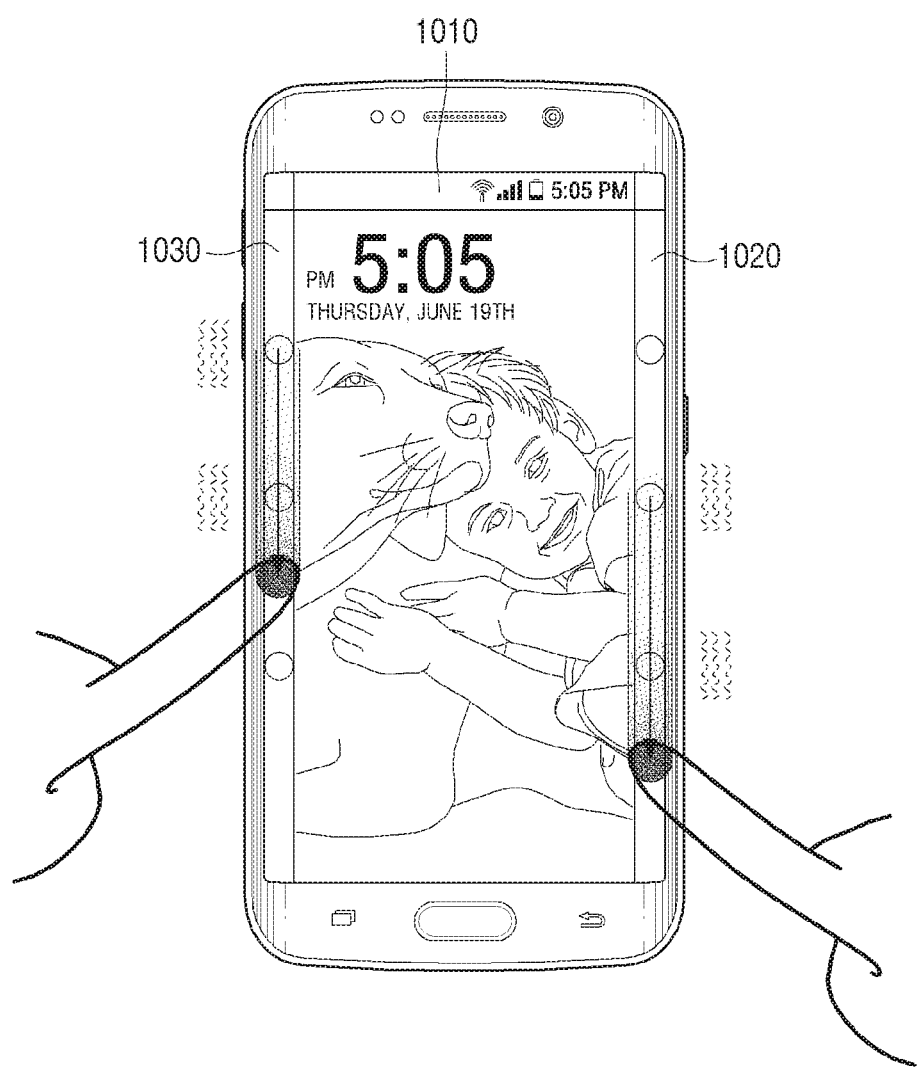
Figure 37:
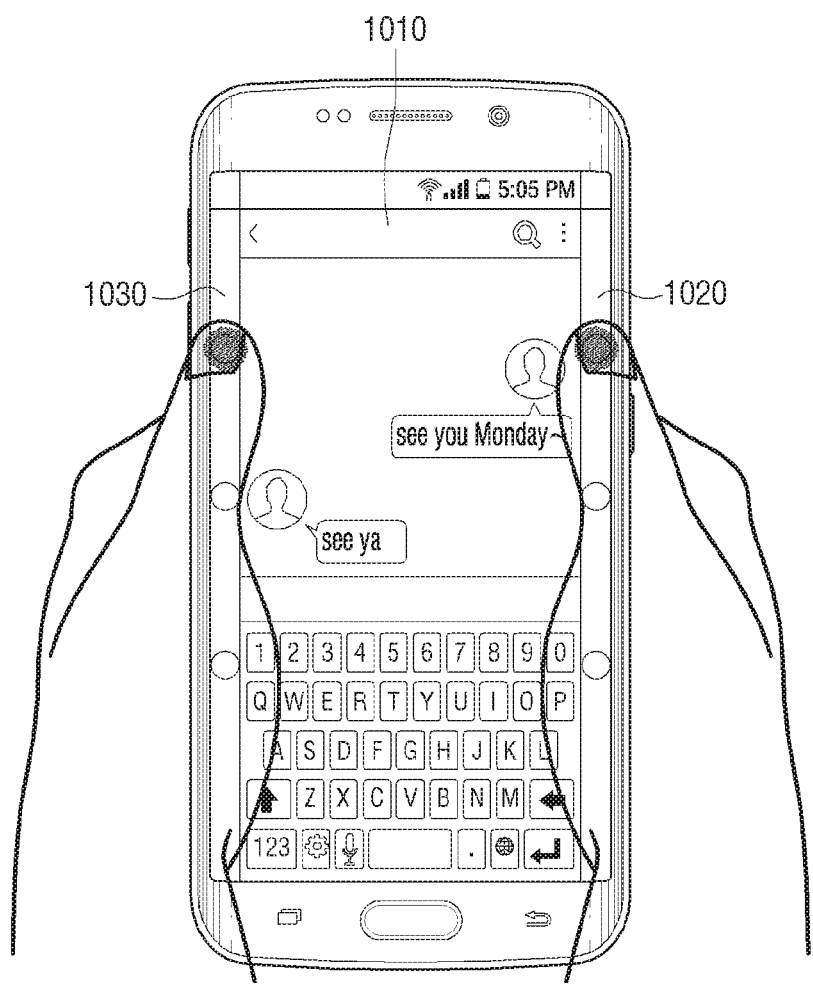

FIGS. 35 to 37 are views illustrating one or more exemplary embodiments in which an auxiliary display area is divided into a plurality of auxiliary touch areas, and the plurality of divided auxiliary touch areas are processed as inputs of predetermined buttons.

Referring to FIG. 35, a user interface window includes the main display area 1010 and the auxiliary display areas 1020, 1030.

Each of the auxiliary display areas 1020, 1030 is divided into three parts and has divided auxiliary display areas. If a user touches the corresponding auxiliary display area, the processor 200 may control the driver 395 to generate a haptic feedback. Protrusions 301, 306 may be disposed on the side of each auxiliary display area as illustrated in FIGS. 12 and 23.

FIG. 36 is a view illustrating an exemplary embodiment of utilizing the above-described plurality of auxiliary touch areas as a touch area of a lock screen.

Referring to FIG. 36, a user interface window includes the main display area 1010 and the auxiliary display areas 1020, 1030.

If the functions of the user terminal device 1000 are locked, the main display area 1010 displays a lock screen. It may be difficult for a person with visual impairment to move to a touch area on the lock screen and input a pattern. According to an exemplary embodiment, a touch pattern is input on a plurality of auxiliary touch areas which can be easily identified physically. If a user inputs a touch pattern on an auxiliary touch area, the processor 200 compares the input touch pattern with a preregistered touch pattern and releases locking of the functions of the user terminal device 1000.

Figure 39:
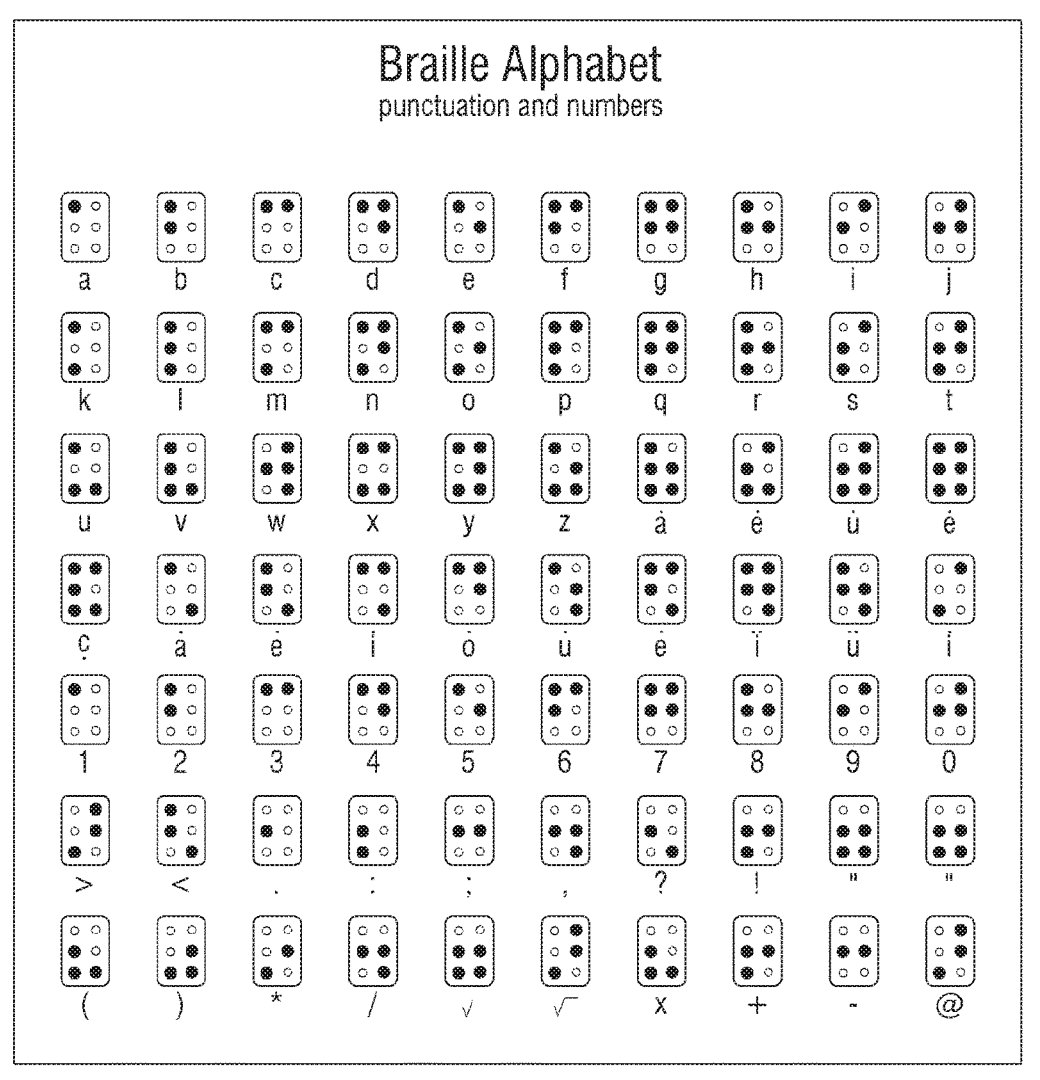

FIG. 37 is a view illustrating an exemplary embodiment of utilizing a plurality of auxiliary touch areas as an input of six points Braille keyboard. FIG. 38 is a view illustrating an example of Korean six points Braille. FIG. 39 is a view illustrating an example of Alphabet six points Braille.

As illustrated in FIGS. 38 and 39, Braille may be represented with six dots, and according to an exemplary embodiment, six auxiliary display areas may be mapped to the corresponding six dots, allowing a user to input characters easily using the Braille display method. For example, through the operation of touching the upper parts of each of the auxiliary display areas 1020, 1030, a user may input the character of '나', the alphabet of 'c', and the number of '3' easily.

Figure 40A:
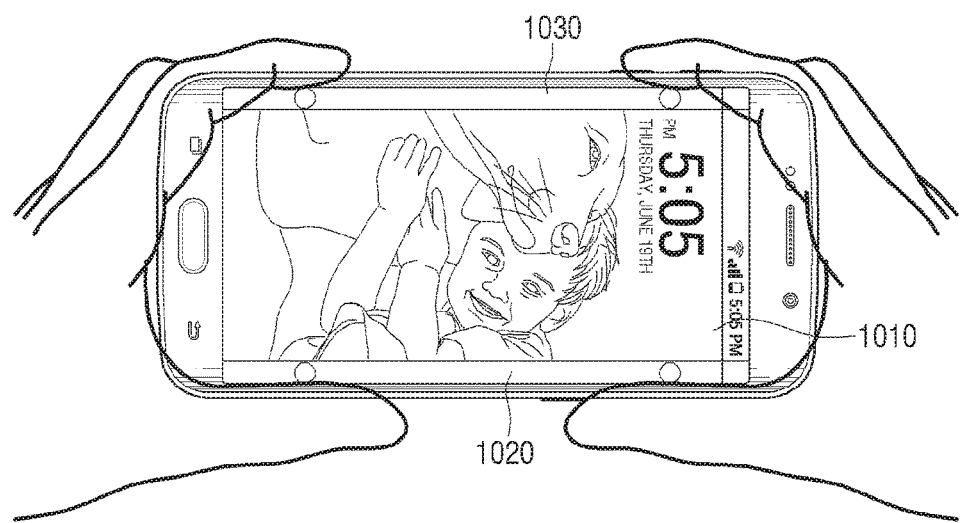
Figure 40B:
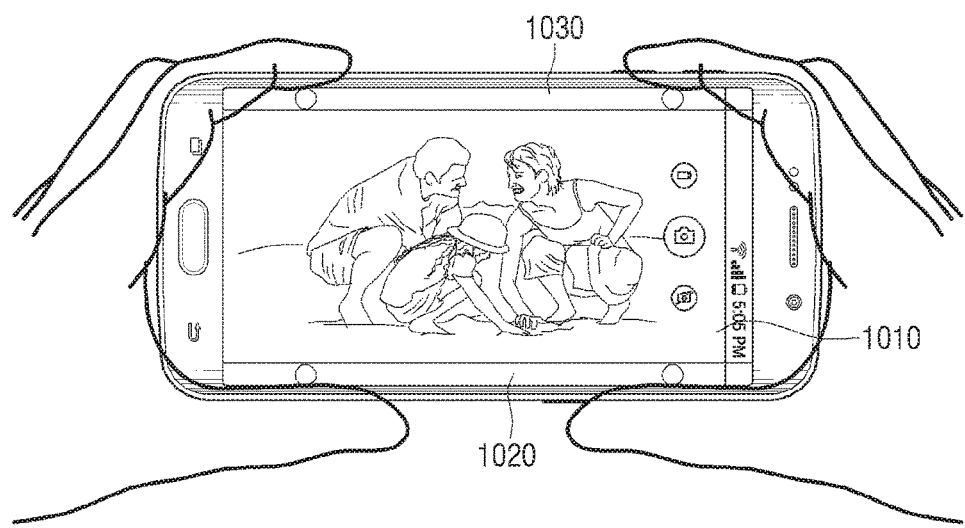

FIGS. 40A and 40B are views illustrating an example of utilizing a plurality of auxiliary touch areas as a quick button.

Referring to FIG. 40A, a user may touch a plurality of divided auxiliary touch areas simultaneously and, in this case, the processor 200 may drive an application corresponding to the touch method. For example, if the operation of a camera is mapped to the touch of four auxiliary touch areas, a user may touch the four auxiliary touch areas simultaneously. In this case, the processor 200 may drive a camera application mapped to the corresponding touch gesture and as illustrated in FIG. 40B, may display a UI corresponding to the camera application on the main display area 1010.

If the above-described touch gesture is performed while the talkback function is activated, a recognition function with respect to a photographed screen may be activated automatically at the same time when the camera application is executed. The recognition function refers to the function of figuring out a photographed object and reading the object using voice or recognizing a text from a photographed screen and reading the recognized text using voice.

Figure 41:
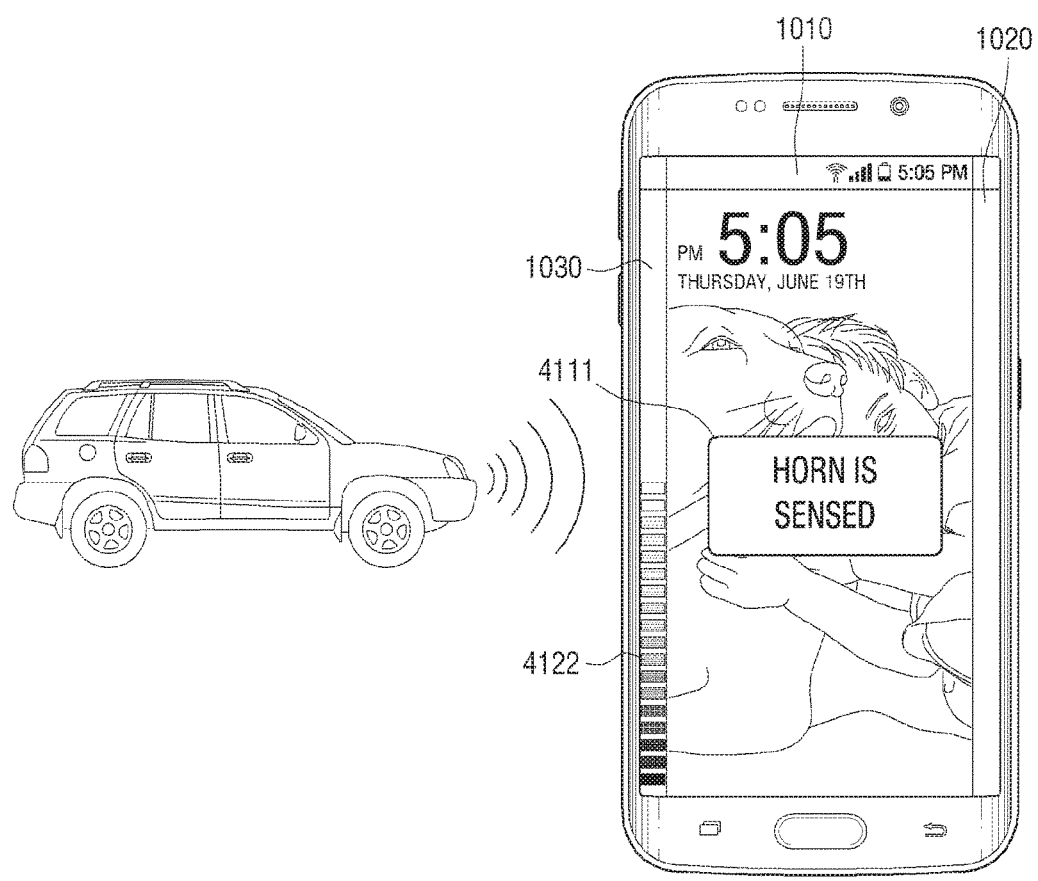
Figure 42:
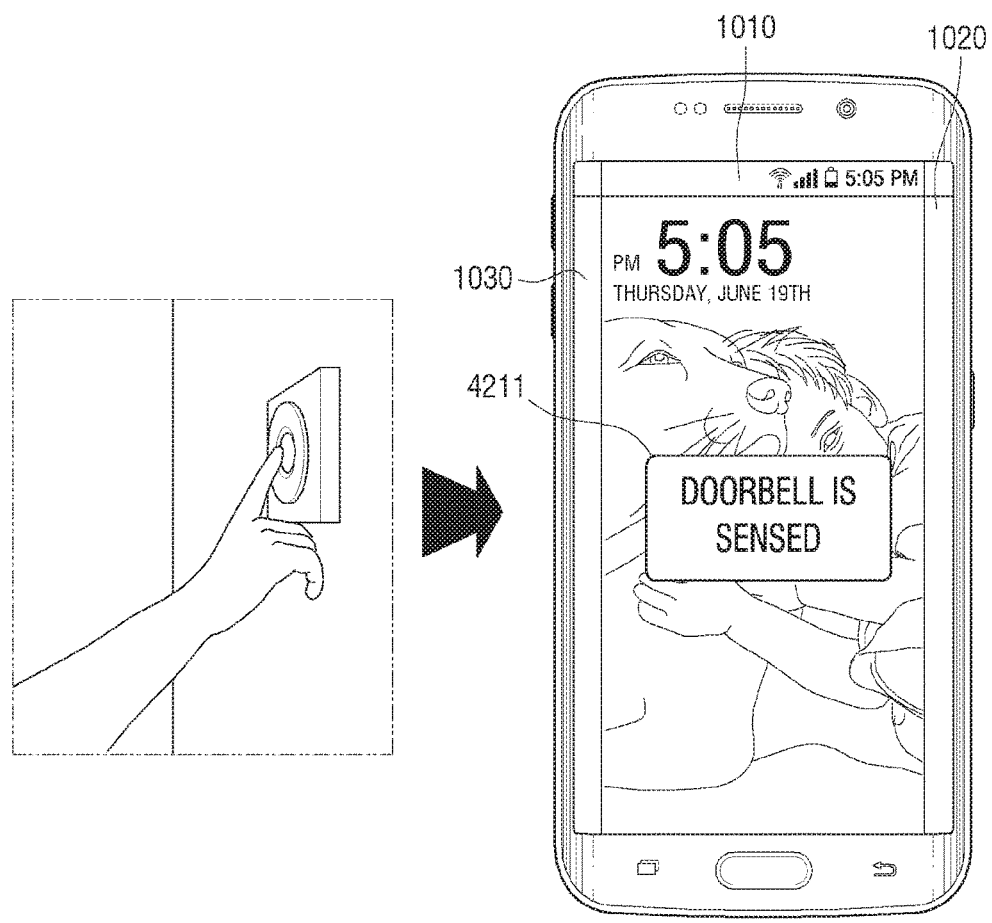

FIGS. 41 and 42 are views illustrating an exemplary embodiment of providing ambient sound information using a message.

Referring to FIG. 41, if sound higher than a predetermined volume is sensed through the microphone 370, the processor 200 may identify the direction and type of the sound received through the microphone 370. The processor 200 may display the identified direction and type of the sound on the main display area 1010 and display direction information on the auxiliary display area 1030 corresponding to the sound direction. The processor 200 may control the touch screen 100 to display the information regarding the volume of the sound in the form of color or equalizer as illustrated in FIG. 41.

Referring to FIG. 42, a user interface window includes the main display area 1010 and the auxiliary display areas 1020, 1030.

When a predetermined sound is sensed, the processor 200 may control the touch screen 100 to display a message corresponding to the sound on the main display area 1010.

According to an exemplary embodiment, the above-described information providing operation may be implemented not only when sound higher than a predetermined volume is sensed but also when a specific type of sound (e.g., baby crying, doorbell, traffic signal sound, etc.) is sensed regardless of volume.

Figure 43:
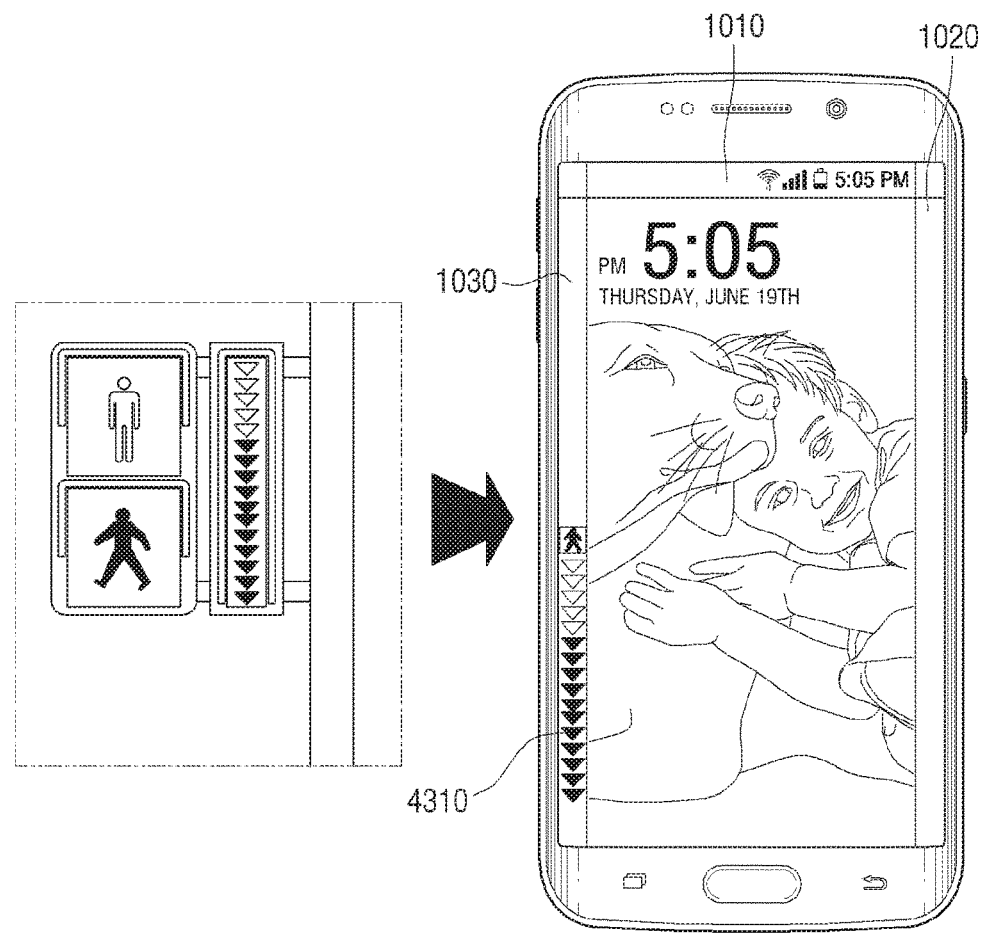
Figure 44:
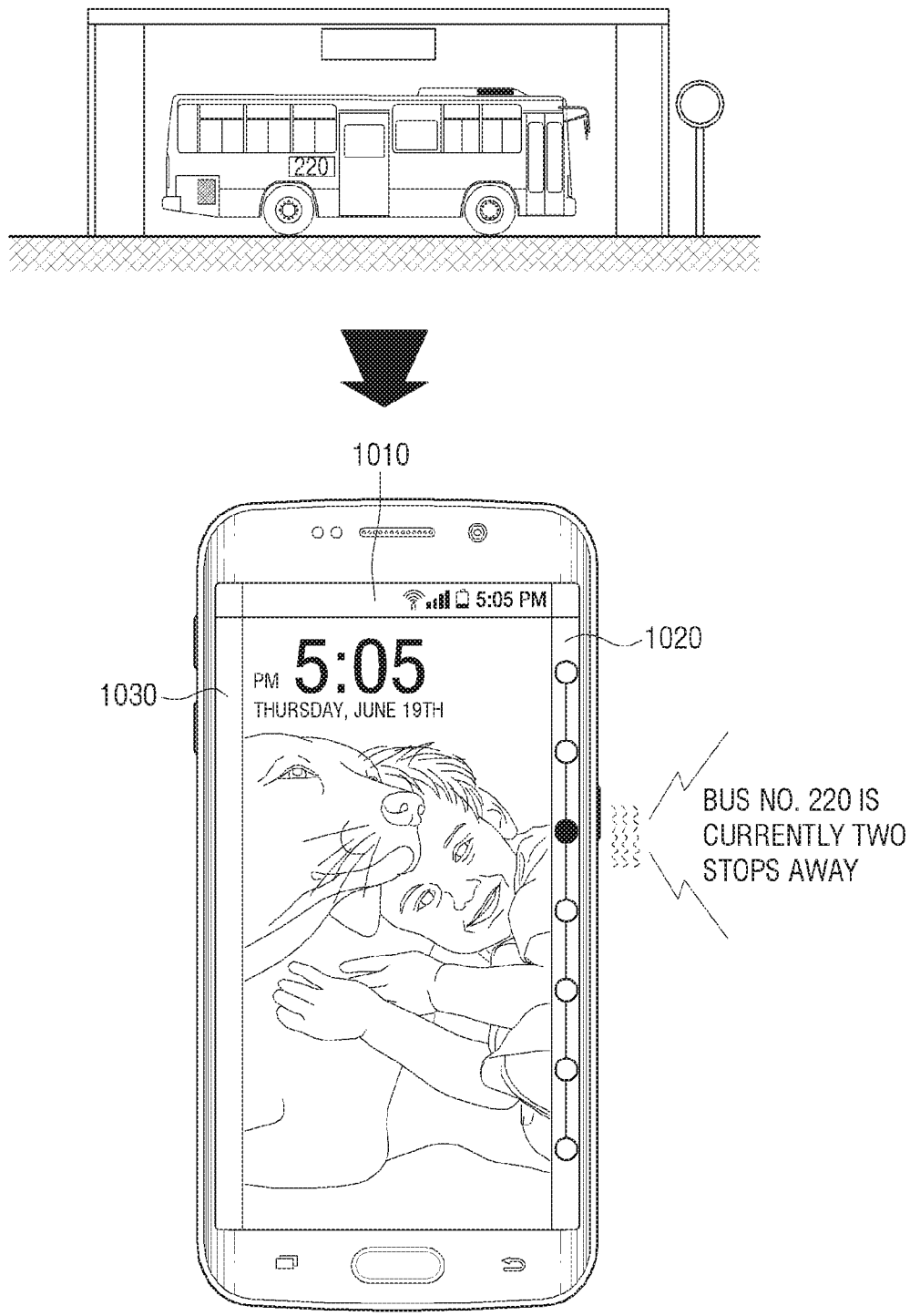
Figure 45:
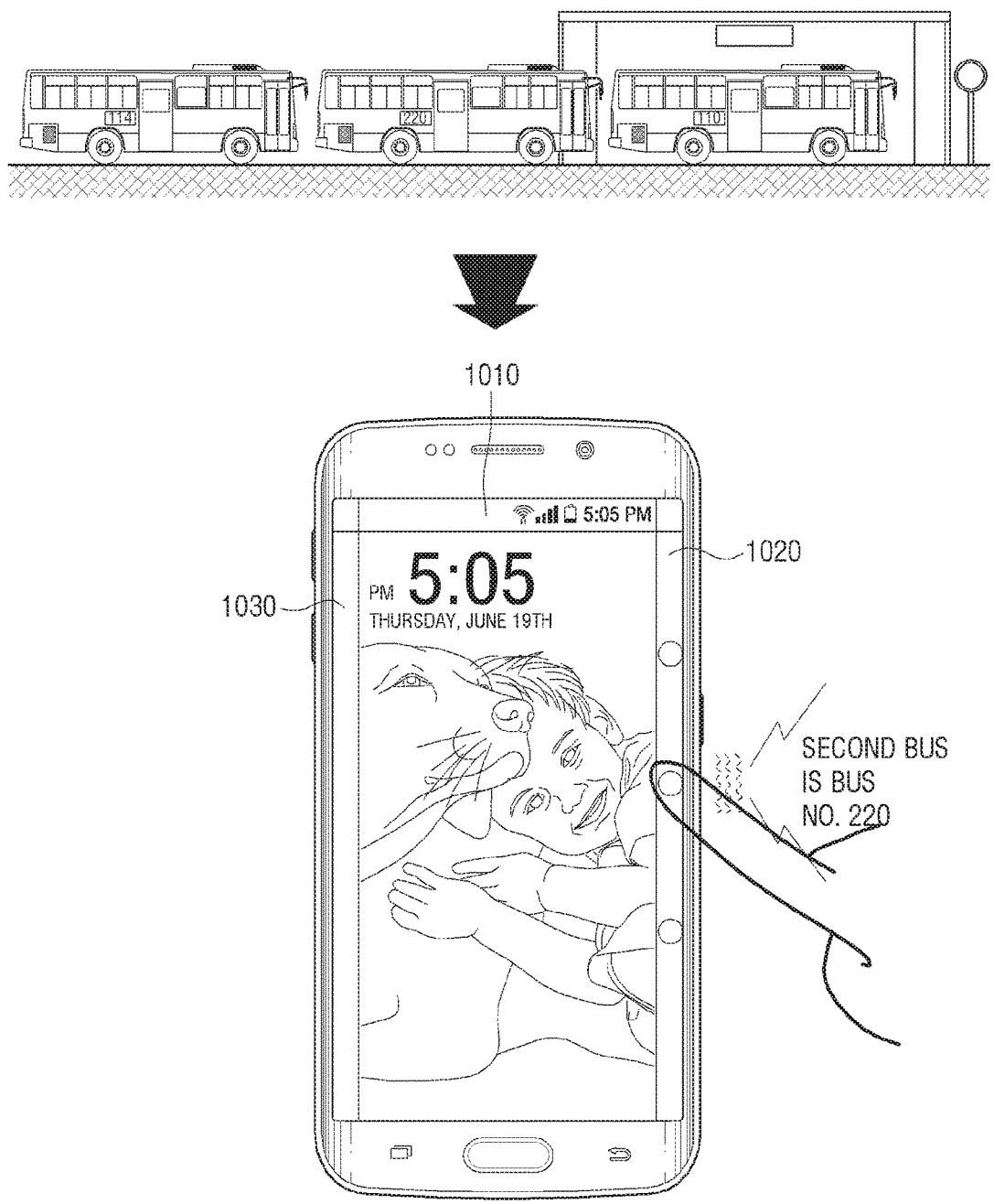

FIGS. 43 to 45 are views illustrating an exemplary embodiment of providing a user with information provided from another terminal device.

A traffic signal light may include a terminal device which provides information regarding the current state information of the traffic signal to peripheral devices. The user terminal device 1000 that moves close to the signal light may receive the information regarding the traffic signal light from the terminal device of the signal traffic light, and the processor 200 may control the touch screen 100 to display the received information.

Referring to FIG. 43, if a traffic signal light (e.g., walk signal, don't walk signal) is in the left side of the user, the processor 200 may sense the location of the signal light, and display the signal information transmitted from the signal light on the auxiliary display area 1030. The processor 200 may sense the location of the traffic signal light by analyzing data provided from the signal light terminal device or the signal generated from the traffic signal light, and display the signal information (e.g., information regarding the current signal) on an auxiliary display area corresponding to the sensed direction. The user terminal device may display an icon 4310 which allows the user to recognize the corresponding information easily.

If the user touches the auxiliary display area, the state of the signal may be provided on the main display area 1010 in the form of text. The received information may be provided to the user in the form of voice. The provided information may be information regarding the current signal state, the remaining time of the current signal state, etc.

Referring to FIG. 44, a terminal device which provides information regarding a bus which arrives at a bus stop and information regarding estimated arrival time of a bus passing through the corresponding bus stop may be located at the bus stop. If a user moves to the bus stop, the user terminal device 1000 may receive various information (e.g., information regarding a bus which currently stops at the bus stop, time information regarding a bus which is expected to arrive at the bus stop, etc.) from the terminal device of the bus stop. If information regarding a bus that is frequently used by the user is preregistered in the bus terminal device, information regarding the corresponding bus may be provided to the user through voice.

Several buses may be located at the bus stop. The terminal device of the bus stop may provide information regarding the buses which arrive at the bus stop and information regarding the order of the buses to the user terminal device 1000. The user terminal device which received such information may map the order information to a plurality of auxiliary display areas.

The processor 200 may sense the direction of a bus stand (e.g., whether a bus arrives at the right side or the left side of a user), and display information received from a terminal device of a bus stop on an auxiliary display area corresponding to the sensed direction.

If a user touches a first area of an auxiliary display area, the user terminal device 1000 may provide information regarding a first bus (for example, bus No. 110), and if the user touches a second area, the user terminal device 1000 may provide information regarding a second bus (for example, bus No. 220) as illustrated in FIG. 45.

If a user touches each area of an auxiliary display area, detailed information regarding the corresponding bus (for example, bus number, final destination of the bus, etc.) may be displayed on the main display area.

Figure 46:
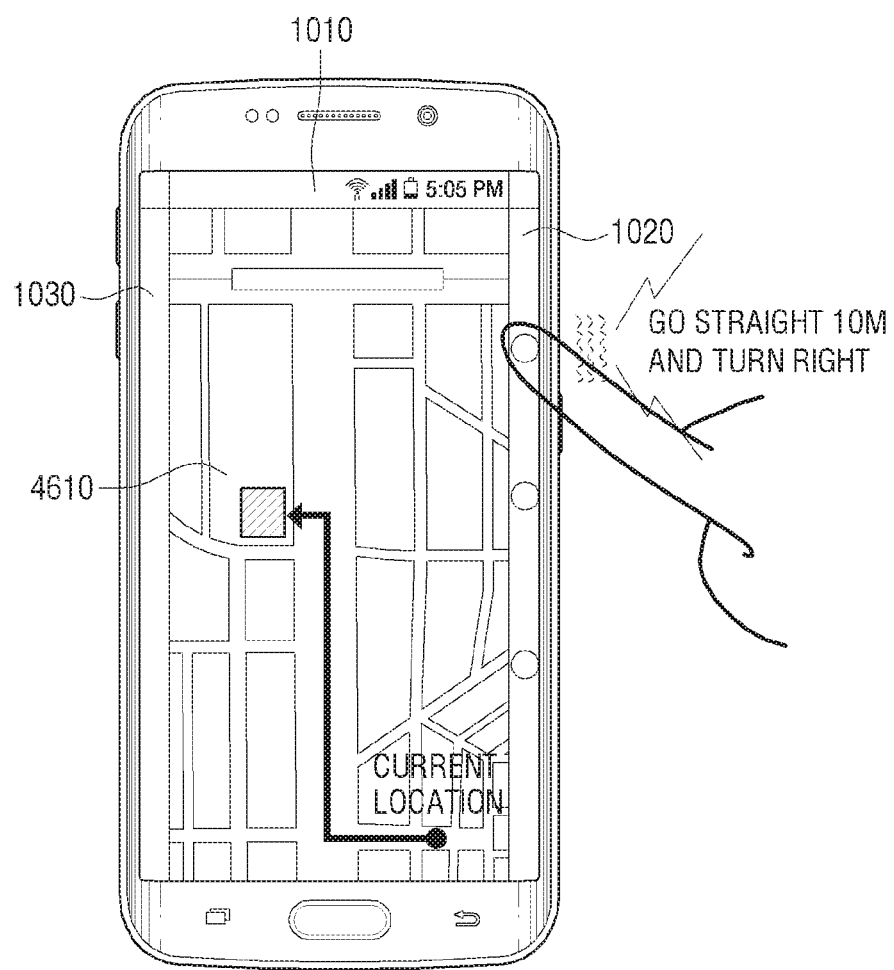
Figure 47:
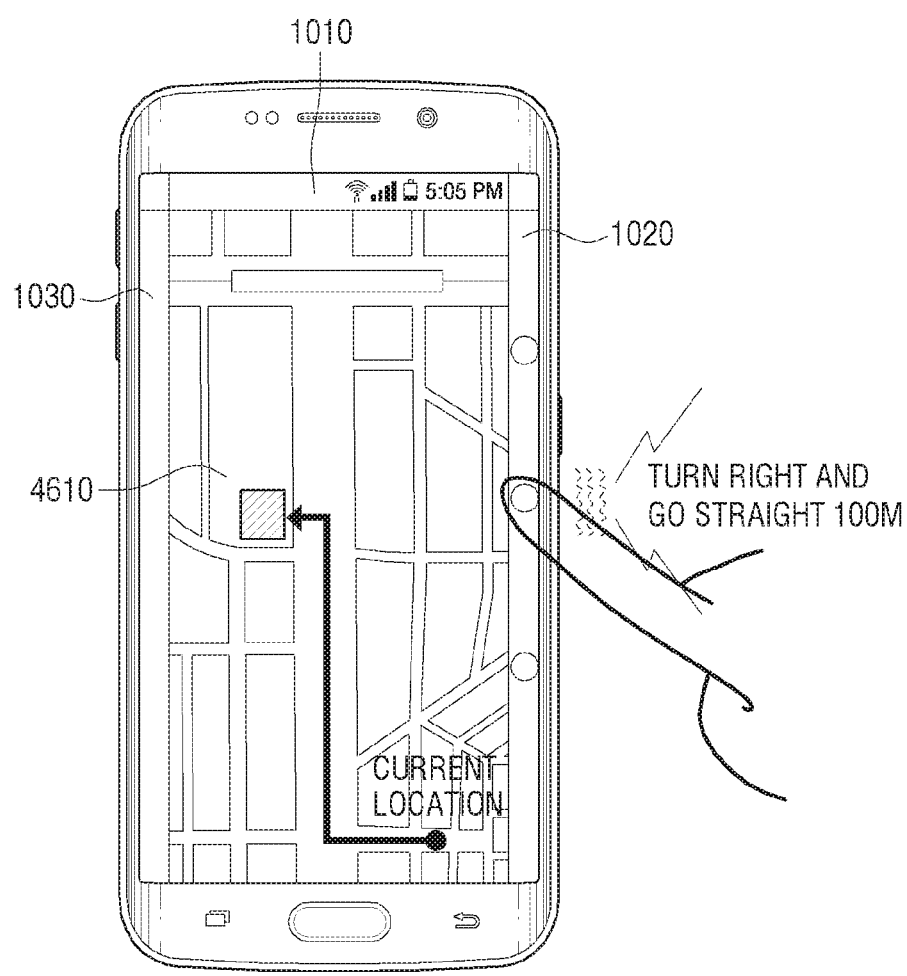

FIGS. 46 and 47 are views illustrating an exemplary embodiment of providing route information to a user.

A user terminal device is equipped with a GPS function and provides a navigation function so that a user may find a route easily. When a navigation function is performed, the user terminal device displays a map and displays the direction, etc., in which the user may need to move using a message or providing such information through voice.

As a visually-handicapped person cannot see a map, he or she may only receive information regarding the direction in which he or she may need to move. However, according to an exemplary embodiment, a plurality of display areas and a plurality of routes are mapped to each other. Thus, a user may be provided with the current information and the subsequent direction in which the user may need to move. Referring to FIG. 46, a user may touch the uppermost part of an auxiliary touch area to be provided with information regarding the direction in which the user may need to move to get to a destination 4610. In addition, the user may touch the next auxiliary touch area to be provided with the next direction in which the user may need to move.

According to an exemplary embodiment, a plurality of routes and a plurality of auxiliary display areas are mapped to each other and provided to a user. However, not only the above route information but also other information having several steps of order (for example, cooking order, operation order, or schedule) may be mapped to a plurality of auxiliary display areas and provided to a user.

FIGS. 48 to 50 are views illustrating a method of selecting a specific icon from among a plurality of icons.

If a user is in a situation in which it is not convenient to use his or her finger or has difficulties in using fingers due to disability with his or her arms, it may not be easy for the user to select a specific icon from among a plurality of icons displayed on the main display area.

According to an exemplary embodiment, a method of selecting an icon easily through the operation of moving the user terminal device 1000 will be provided.

Referring to FIG. 48, if an event of waving a terminal device in the left and right direction, an event of sensing a plurality of auxiliary touch areas, etc., is sensed, the processor 200 may control the touch screen 100 to display a plurality of icons on the main display area and display a UI 4830 indicating a selection area on the auxiliary display area.

In this state, a user may tilt the user terminal device 100 in the left/right or up/down direction. In response to the movement of the user terminal device 1000, the processor 200 may move and display the plurality of displayed icons on the main display area and the auxiliary display area, and if a touch with respect to the main display area is sensed, may perform a function corresponding to an icon which is disposed on the selection area.

For example, a user may wish to drive a camera application on a screen in which a plurality of icons are disposed as illustrated in FIG. 48.

To move an icon corresponding to a camera application to the selection area 4830, a user may perform three tilting operations to the right side and one tilting operation in the upper direction.

For example, if a user tilts a user terminal device to the right side while a plurality of icons area displayed on the main display area 1010, the plurality of icons on the main display area may move to the right side as a whole. Accordingly, the plurality of icons are displayed on both of the main display area and the auxiliary display area (4911)

If the user tilts the user terminal device to the right side once again, the plurality of displayed icons are moved to the right side and displayed (4912). If the user tiles the user terminal device to the right side once again, the plurality of displayed icons are moved to the right side and displayed (4913).

Subsequently, if the user tilts the user terminal device in the upper side, the plurality of displayed icons are moved to the upper side as a whole and displayed (4914).

As the icon which the user wishes to execute is disposed on a selection area 4930, the user may drive the camera application by touching any area of the main display area 1010.

According to an exemplary embodiment, in response to the movement of a plurality of icons, the icons which move outside the main display area or the auxiliary display area disappear gradually. However, the screen on which the icons are disposed cannot consist of a plurality of pages. Thus, in response to the movement of the plurality of icons, icons of another page that is adjacent to the current screen may be displayed in replacement of the icons disappeared.

Referring to FIG. 50, if a predetermined event occurs, a UI 5020 indicating a predetermined area selection area may be displayed on an auxiliary display area (5011). In this case, if a user performs a tilting operation to the right side, a plurality of icons which are displayed move to the right side as a whole, and the icons which are disposed on the right-end side of the page which is in the left side of the current page are displayed on the space which is generated by the movement of the plurality of icons (5012). Subsequently, if the user performs a tilting operation to the right side once again, the plurality of displayed icons move to the right side as a whole, and new icons which used to be disposed on the left page are displayed (5013). In this case, if the user performs a tilting operation in the upper side, the plurality of displayed icons are moved to the upper side as a whole and displayed. The icons which used to be disposed on the upper-end side move to the lower side and are displayed (5014). The user may touch the UI 5020 to execute the application for the function icon that is displayed in the UI 5020 (5015).

As such, a user may select an icon to be executed easily using the operation of tilting the user terminal device 1000. Thus, it is possible to perform easy interaction.

Figure 51:
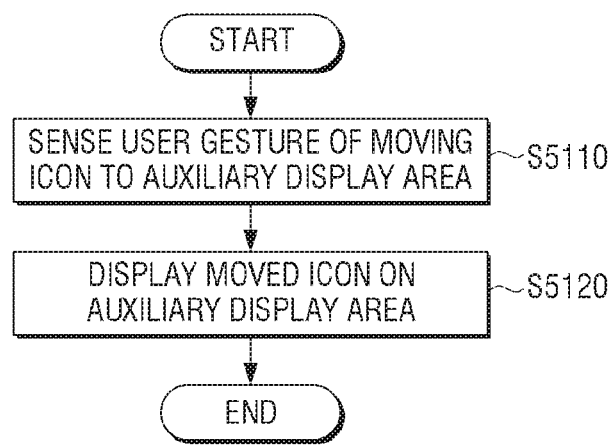
FIGS. 51 to 54 are flowcharts illustrating a displaying method of a user terminal device, according to an exemplary embodiment.
Figure 52:
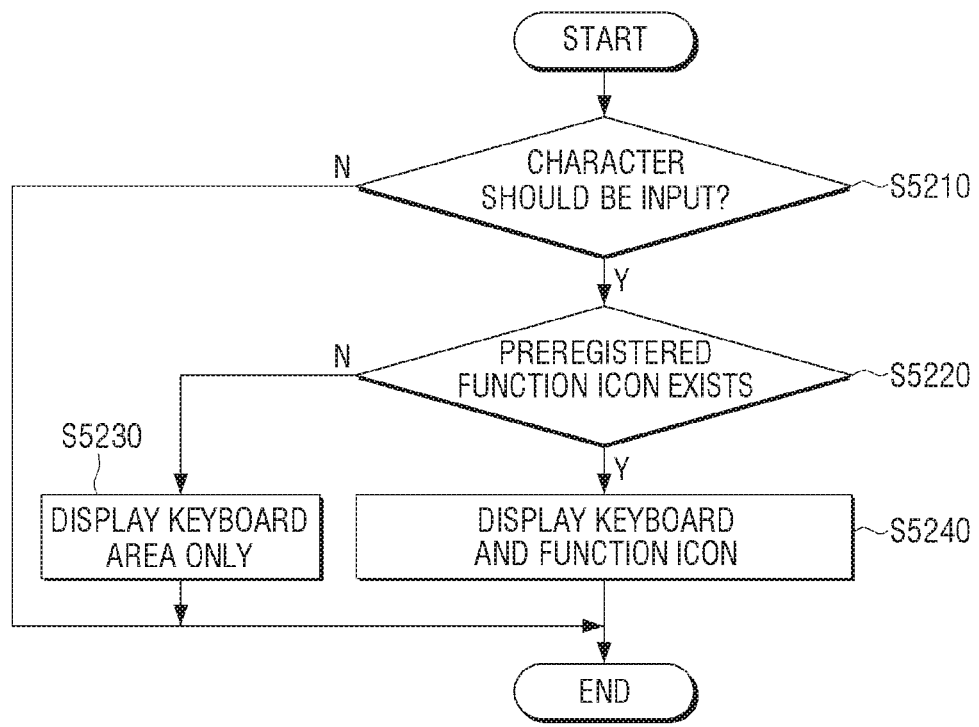
Figure 53:
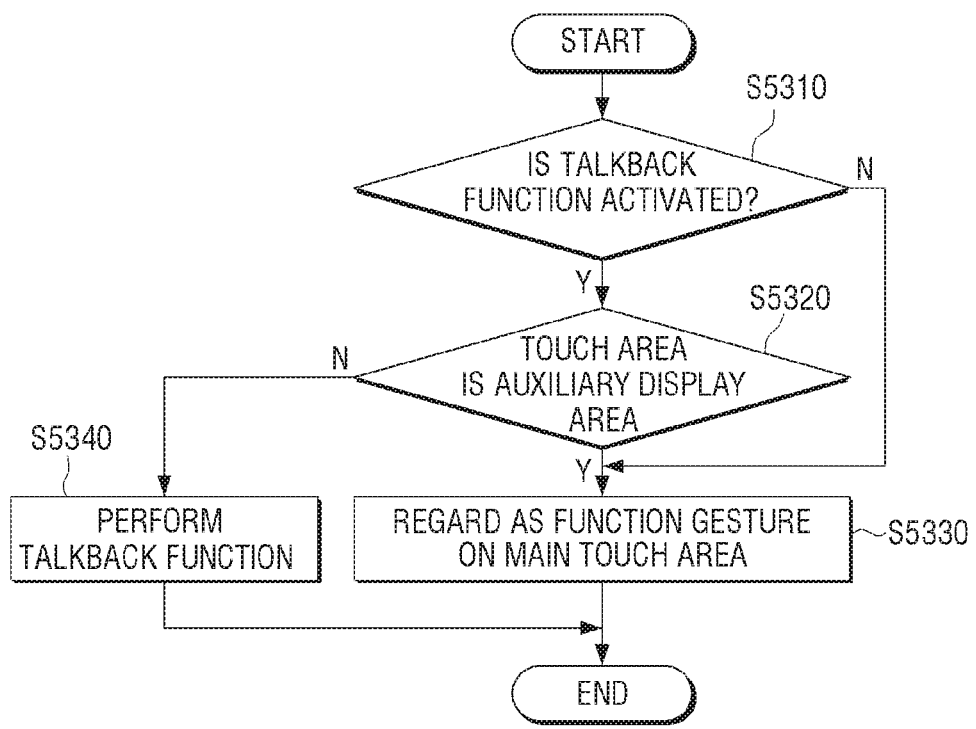

FIGS. 51 to 53 are flowcharts illustrating a displaying method of a user terminal device, according to an exemplary embodiment.

FIG. 51 is a flowchart provided to explain a displaying method of a user terminal device according to an exemplary embodiment (e.g., expansion of keyboard functions).

Referring to FIG. 51, a user gesture of moving an icon displayed on the main display area to the auxiliary display area is sensed (S5110). A user may select an icon to be registered as a function icon from among several icons displayed on the main display area, move the corresponding icon to an auxiliary display area, and sense a user gesture of placing the corresponding icon on the corresponding auxiliary display area (e.g., a drag-and-drop gesture). When such a drag-and-drop with respect to a specific icon is sensed, it is determined to be a user's control command to register the corresponding icon as a function icon and the procedures to register the corresponding icon as a function icon may be performed. The user gesture of placing an icon displayed on the main display area on the auxiliary display area may be referred to as a registration gesture. According to an exemplary embodiment, registering a function icon using a drag-and-drop method is described, but an icon to be registered as a function icon may be selected from among a plurality icons displayed on a predetermined setting UI screen.

If a user terminal device includes a plurality of auxiliary display areas, a corresponding function icon may be registered in the auxiliary display area in which a user dropped the icon. If a user terminal device includes a plurality of auxiliary display areas and different types of icons are displayed for each auxiliary display area, a corresponding icon may be registered in an auxiliary display area corresponding to the type of the corresponding icon regardless of the auxiliary display area in which a user dropped the icon.

According to an exemplary embodiment, a function icon is registered when a user drags and drops the icon in an auxiliary display area, but there may be an additional step for the user to confirm that the corresponding icon is to be registered as a function icon.

The moved icon is displayed on an auxiliary display area (S5120). When the corresponding icon is registered as a function icon, the corresponding icon may be displayed on the auxiliary display area. If a user terminal device includes a plurality of auxiliary display areas, the corresponding icon may be displayed on the auxiliary display area designated by the user or on the auxiliary display area corresponding to the type of the corresponding icon.

According to an exemplary embodiment, the operation of displaying an icon on an auxiliary display area may be performed right after the icon is registered.

FIG. 52 is a flowchart illustrating a displaying method of a user terminal device according to an exemplary embodiment (e.g., expansion of keyboard functions).

Referring to FIG. 52, it is determined whether a character should be input (S5210). Specifically, it is determined whether a user selects an area for inputting a character on an application which is currently executed. For example, it is determined whether a user selects an area for inputting a web page address while surfing the Internet or selects an area for inputting a search word.

If it is determined that a character should be input, it is determined whether a function icon corresponding to the current application is registered (S5220). If a function icon is displayed for all applications, it is determined whether there is a preregistered icon.

If there is no preregistered function icon (S5220-N), only a virtual keyboard may be displayed on a predetermined area (e.g., a keyboard area) of the main display area (S5230).

If there is a preregistered function icon (S5220-Y), a virtual keyboard may be displayed on a predetermined keyboard area (e.g., the lower part of the main display area) of the main display area, and a function icon may be displayed on the left side or right side of the virtual keyboard (S5240). If the number of preregistered function icons exceeds a predetermined number, the function icons which are arranged according to a predetermined arrangement standard may be displayed on the auxiliary display area.

According to the displaying method of a user terminal device according to an exemplary embodiment, a function icon to expand the functions of a virtual keyboard is displayed on the auxiliary display area. Thus, a user may input characters more easily. As functions icons are disposed around the virtual keyboard which can be touched easily, a user may select the function icons easily while typing on the virtual keyboard. The displaying method of FIG. 52 can be executed on a user terminal device having the configuration of FIG. 1 or FIG. 14, and may also be executed on a user terminal device having other configurations.

FIG. 53 is a flowchart provided to explain an interaction method of a user terminal device according to an exemplary embodiment (e.g., expansion of an interaction method).

Referring to FIG. 53, whether a talkback function is activated may be determined (S5310). Specifically, while the talkback function is activated (S5310-Y), whether a user's touch gesture is performed on an auxiliary display area may be determined (S5320).

If it is determined that a touch gesture is performed not with respect to an auxiliary display area but with respect to a main display area (S5320-N), the talkback function corresponding to the touch gesture may be performed (S5340).

If a user's touch gesture is performed with respect to an auxiliary display area, the touch gesture may be regarded as a touch gesture on the main display area in a state in which the talkback function is inactivated, and a function may be performed accordingly (S5330).

The interaction method of a user terminal device according to an exemplary embodiment supports various interactions even when the talkback function is activated, and thus, user convenience can be improved. The interaction method of FIG. 53 may be executed on a user terminal device having the configuration of FIG. 14 and may also be executed on a user terminal device having other configurations.

Figure 54:
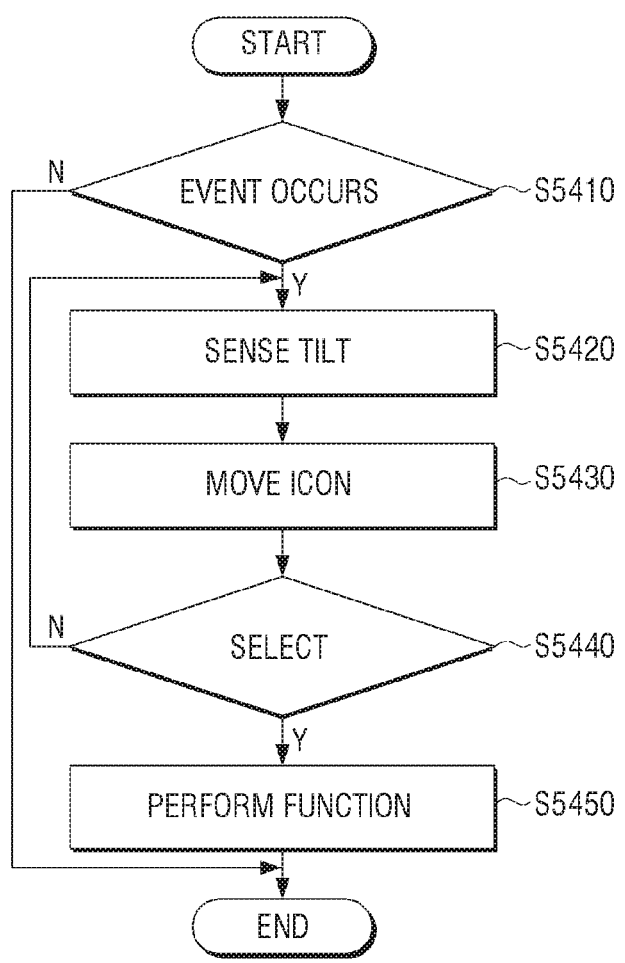

FIG. 54 is a flowchart provided to explain an interaction method of a user terminal device according to an exemplary embodiment (e.g., expansion of interaction).

Referring to FIG. 54, whether an event occurs is determined (S5410). Specifically, it may be determined whether a gesture of waving a user terminal device in the left and right direction is input or a touch gesture of touching a plurality of auxiliary display areas is input.

If a predetermined event occurs, the movement of a user terminal device is sensed (S5420). In response to the sensed movement, a plurality of icons displayed are moved (S5430). Whether a user's selection gesture is input is determined (S5440).

If a user's selection gesture is not input (S5440-N), the above-described operations of sensing a movement and moving icons are repeated.

If a selection gesture is input, a function corresponding to an icon which is disposed on a predetermined area may be performed (S5450).

The interaction method of a user terminal device according to an exemplary embodiment may use a movement of the terminal device as an interaction and thus, user convenience can be improved. The interaction method of FIG. 54 may be executed on a user terminal device having the configuration of FIG. 1 or FIG. 14, and may also be executed on a user terminal device having other configurations.

The interaction method of a user terminal device or the screen displaying method according to the one or more exemplary embodiments may be stored in a non-transitory computer readable medium which can be mounted and used in various apparatuses.

The non-transitory recordable medium may refer to a medium which may store data semi-permanently rather than storing data for a short time, such as register, cache, memory, etc., and is readable by an apparatus. The above-described various applications and programs may be stored and provided in a non-transitory recordable medium such as CD, DVD, hard disk, Blu-ray disk, USB, memory card, ROM, etc.

The embodiments described above are exemplary and are not to be construed as limiting the present disclosure. The present teaching can be readily applied to other types of apparatuses. Also, the description of the exemplary embodiments is illustrative, and is not intended to limit the scope of the claims, and many alternatives, modifications, and variations will be apparent to those skilled in the art.

What is claimed is:

1. A user terminal device comprising:
   a touch screen comprising:
      a main display area; and
      an auxiliary display area comprising a curved portion extending from the main display area; and
      a processor configured to:
         in response to a first user command for moving a first icon that is displayed on the main display area to the auxiliary display area being input while a user interface of an application is displayed in the main display area:
            determine that a function icon registration command is input and register the first icon as a function icon for the application that is displayed in the main display area, and
            control the touch screen to display the function icon on the auxiliary display area; and
         in response to a second user command for selecting the function icon that is displayed on the auxiliary display area being input, execute the application that is displayed in the main display area,
      wherein the auxiliary display area comprises a left auxiliary display area and a right auxiliary display area, and the processor is further configured to, in response to an input of a touch gesture in both the left auxiliary display area and the right auxiliary display area moving toward the main display area, close the application that is currently being displayed.

2. The user terminal device of claim 1, wherein the processor is further configured to, in response to the application being executed, control the touch screen to display a plurality of function icons that are registered with respect to the executed application on the auxiliary display area.

3. The user terminal device of claim 2, wherein the processor is further configured to, in response to a number of the plurality of function icons that are registered with respect to the application being more than a predetermined number, control the touch screen to display the plurality of function icons arranged according to a predetermined standard on the auxiliary display area.

4. The user terminal device of claim 1, wherein the function icon is at least one of an emoticon that is input in a text input area of the auxiliary display area, a special character, a predetermined character set, and a function key to perform a function.

5. The user terminal device of claim 1, wherein the processor is further configured to control the touch screen to display at least one of a virtual keyboard and a handwriting input area on the main display area.

6. The user terminal device of claim 1, wherein the function icon corresponds to a predetermined event.

7. The user terminal device of claim 6, wherein the processor is further configured to, in response to an input on the auxiliary display area, change the function icon displayed on the auxiliary display area to another function icon and display the changed function icon.

8. The user terminal device of claim 6, wherein the processor is further configured to control the touch screen to display at least one of a virtual keyboard and a handwriting input area on a predetermined area of the main display area, and to display the function icon on the auxiliary display area that is nearest to the at least one of the virtual keyboard and the handwriting input area.

9. A displaying method of a user terminal device comprising a touch screen, the touch screen comprising a main display area and an auxiliary display area comprising a curved portion extending from the main display area, the method comprising:
   in response to a first user command for moving a first icon that is displayed on the main display area to the auxiliary display area being input while a user interface of an application is displayed in the main display area:
      determining that a function icon registration command is input and register the first icon as a function icon for the application that is displayed in the main display area, and
      displaying the function icon in the auxiliary display area; and
   in response to a second user command for selecting the function icon that is displayed on the auxiliary display area being input, executing the application that is displayed in the main display area,
   wherein the auxiliary display area comprises a left auxiliary display area and a right auxiliary display area, and in response to an input of a touch gesture in both the left auxiliary display area and the right auxiliary display area moving toward the main display area, closing the application that is currently being displayed.

10. The method of claim 9, wherein the displaying comprises, in response to the application being executed, displaying a plurality of function icons that are registered with respect to the executed application on the auxiliary display area.

* * * * *